United States Patent
Miya et al.

(10) Patent No.: US 11,131,774 B2
(45) Date of Patent: Sep. 28, 2021

(54) POSITIONING AUGMENTATION DEVICE, POSITIONING AUGMENTATION SYSTEM, AND POSITIONING AUGMENTATION METHOD

(71) Applicant: Mitsubishi Electric Corporation, Chiyoda-ku (JP)

(72) Inventors: Masakazu Miya, Chiyoda-ku (JP); Seigo Fujita, Chiyoda-ku (JP); Yuki Sato, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 347 days.

(21) Appl. No.: 16/337,531

(22) PCT Filed: Nov. 7, 2016

(86) PCT No.: PCT/JP2016/082999
§ 371 (c)(1),
(2) Date: Mar. 28, 2019

(87) PCT Pub. No.: WO2018/083803
PCT Pub. Date: May 11, 2019

(65) Prior Publication Data
US 2019/0250277 A1 Aug. 15, 2019

(51) Int. Cl.
*G01S 19/07* (2010.01)
*G01S 19/28* (2010.01)
(Continued)

(52) U.S. Cl.
CPC .............. *G01S 19/07* (2013.01); *G01S 19/05* (2013.01); *G01S 19/08* (2013.01); *G01S 19/20* (2013.01); *G01S 19/28* (2013.01)

(58) Field of Classification Search
CPC .......... G01S 19/07; G01S 19/05; G01S 19/08; G01S 19/20; G01S 19/28; G01S 19/41; G01S 5/009
(Continued)

(56) References Cited

U.S. PATENT DOCUMENTS

| | | |
|---|---|---|
| 5,808,581 A | 9/1998 | Braisted et al. |
| 2005/0090265 A1* | 4/2005 | Abraham .............. G01S 5/0036 455/456.1 |

(Continued)

FOREIGN PATENT DOCUMENTS

| | | |
|---|---|---|
| JP | 10-253740 A | 9/1998 |
| JP | 2004-77228 A | 3/2004 |

(Continued)

OTHER PUBLICATIONS

Extended European Search Report dated May 13, 2020, in Patent Application No. 16920919.4, citing document AX therein, 7 pages.

(Continued)

*Primary Examiner* — Harry K Liu
(74) *Attorney, Agent, or Firm* — Oblon, McClelland, Maier & Neustadt, L.L.P.

(57) ABSTRACT

In a positioning augmentation device (40), a plan making unit (84) selects a subset satisfying selection conditions from within a candidate set that is a set of satellites being selection candidates and saves plan data (43) indicating the selected subset in a memory (72). A plan alteration unit (85) acquires integrity information indicating quality of a positioning signal transmitted from each satellite and detects a satellite of which the quality of the positioning signal does not satisfy quality conditions, from within the subset selected by the plan making unit (84), based on the acquired integrity information. The plan alteration unit (85) replaces the detected satellite in the subset with another satellite included (Continued)

in the candidate set. A message generation unit (87) makes satellites, included in the subset indicated by the plan data (43) saved in the memory (72) among the satellites included in the candidate set, objects of positioning augmentation and generates a message (41) for distribution of augmentation information to be used for the positioning augmentation.

17 Claims, 20 Drawing Sheets

(51) Int. Cl.
*G01S 19/08* (2010.01)
*G01S 19/20* (2010.01)
*G01S 19/05* (2010.01)

(58) Field of Classification Search
USPC .................................................. 342/357.44
See application file for complete search history.

(56) References Cited

U.S. PATENT DOCUMENTS

| | | | | |
|---|---|---|---|---|
| 2005/0104772 | A1* | 5/2005 | Diggelen | G01S 19/08 342/357.45 |
| 2009/0128409 | A1* | 5/2009 | Trautenberg | G01S 19/08 342/357.45 |
| 2011/0025558 | A1* | 2/2011 | Levy | G01S 19/08 342/357.58 |
| 2011/0169693 | A1* | 7/2011 | Trautenberg | G01S 19/08 342/357.58 |
| 2015/0077288 | A1* | 3/2015 | Rao | G01S 19/05 342/357.51 |
| 2017/0184723 | A1* | 6/2017 | Yun | G01S 19/20 |

FOREIGN PATENT DOCUMENTS

| | | |
|---|---|---|
| JP | 2005-181051 A | 7/2005 |
| JP | 2010-54469 A | 3/2010 |
| JP | 2010-151725 A | 7/2010 |
| JP | 2010-163118 A | 7/2010 |
| JP | 2014-219204 A | 11/2014 |

OTHER PUBLICATIONS

Sato, Y. et al., "Optimal Selection Algorithm for Positioning Satellites in Correction Service with Limited Data Bandwidth", Gnss 2015—proceedings of the 28th international technical meeting of the satellite division of the institute of navigation, XP056010902, Sep. 18, 2015, pp. 1153-1158.

International Search Report dated Jan. 24, 2017, in PCT/JP2016/082999 filed on Nov. 7, 2016.

Sato, Y. et al., "Selection Method of Positioning Satellites for Augmentation in Centimeter Level Augmentation Service", the $59^{th}$ Proceedings of Space Sciences and Technology Conference, The Japan Society for Aeronautical and Space Sciences, Oct. 7, 2015, 3H08, total 7 pages (with English Abstract).

Sato, Y. et al., "The development status of Japanese QZSS Centimeter Level Augmentation Service (CLAS)—Selective augmentation of positioning satellites—", the $60^{th}$ Proceedings of Space Sciences and Technology Conference, The Japan Society for Aeronautical and Space Sciences, Sep. 6, 2016, 3K08, total 5 pages (with English Abstract).

Sato, Y. et al., Presentation materials for "The development status of Japanese QZSS Centimeter Level Augmentation Service (CLAS)—Selective augmentation of positioning satellites—", Sep. 8, 2016, total 21 pages (with partial translation).

European Office Action dated Jul. 14, 2021 in Application No. 16920919.4 (6 pages).

* cited by examiner

Fig. 3

| Sub Type | Sub Type Name | BIT COUNT |
|---|---|---|
| 1 | Compact SSR Mask | $49 + (61 + Nsat * Nsig) * Nsys$ |
| 2 | Compact SSR GNSS Orbit Correction | $37 + (51 \text{ or } 49) * Nsat$ |
| 3 | Compact SSR GNSS Clock Correction | $37 + 15 * Nsat$ |
| 4 | Compact SSR GNSS Satellite Code Bias | $37 + 11 * Ncode * Nsat$ |
| 5 | Compact SSR GNSS Satellite Phase Bias | $37 + 17 * Nphase * Nsat$ |
| 6 | Compact SSR GNSS Satellite Code and Phase Bias | $37 + 28 * Nsig * Nsat$ |
| 7 | Compact SSR GNSS URA | $37 + 6 * Nsat$ |
| 8 | Compact SSR STEC Correction | $44 + Nsat + (20 \text{ or } 44 \text{ or } 54) * Msat$ |
| 9 | Compact SSR Gridded Correction | $57 + Nsat + (17 + (7 \text{ or } 16) * Msat) * Ngrid$ |
| 10 | Compact SSR Service Information | To Be DETERMINED |

Fig. 5

| Algorithm SATELLITE SELECTION |
|---|
| Input: AUGMENTATION TIME t, ORBIT INFORMATION O, INTEGRITY INFORMATION I |
| Output: COMMON SATELLITES $CS_T$, AREA SATELLITES $AS_{T,A}$, REMOTE-ISLAND SATELLITE $RS_{T,A}$ |
| Static variable: PLAN P, ALTERNATIVE REQUEST LIST |
| 1:  T ← TIME INDEX (t) FOR EVERY 30 SECONDS |
| 2:  $CS_T$ ← READ FROM $P_T$ |
| 3:  A, R ← TWO AREAS AND REMOTE ISLAND (t) AS OBJECTS OF COMBINATION DETERMINATION |
| 4:  $RS_{T,A}$ ← SELECTED FROM $CS_T$ |
| 5:  [P, ADDITION TO ALTERNATIVE REQUEST LIST] ← COMMON-SATELLITE CONFINED ALTERATION (T, A, I, P) |
| 6:  $AS_{T,A}$ ← $P_{T,A}$ |
| 7:  if $AS_T$ FOR ALL 12 AREAS HAVE BEEN SETTLED |
| 8:  P ← COMMON-SATELLITE ALTERATION (ALTERNATIVE REQUEST LIST, T+1, I, O, P) |
| 9:  ALTERNATIVE REQUEST LIST ← [ ] |
| 10: end |
| 11: if t = 10 MINUTES BEFORE SUBSEQUENT HOUR ON THE HOUR, P ← PLAN MAKING (O, P) end |

Fig. 7

| Algorithm PLAN MAKING |
|---|
| Input: ORBIT INFORMATION O, PLAN P |
| Output: PLAN P |
| 1: $T_{hour} \leftarrow$ TIME INDEX OF SUBSEQUENT HOUR ON THE HOUR |
| 2: $P_{hour:hour+119} \leftarrow$ ASSIGNMENT OF GPS WITH HIGH ANGLE OF ELEVATION (O) |
| 3: $P_{hour:hour+pmin-1} \leftarrow$ ADJUSTMENT FROM CONNECTING PERIODS (O, $P_{hour:hour+pmin-1}$) |
| 4: $P_{hour:hour+119} \leftarrow$ COMMON-SATELLITE EXPANSION (O, $P_{hour:hour+119}$) |
| 5: for all AREAS A |
| 6: $P_{hour:hour+119} \leftarrow$ COMMON-SATELLITE CONFINED ADDITION (O, A, $P_{hour:hour+119}$) |
| 7: end |

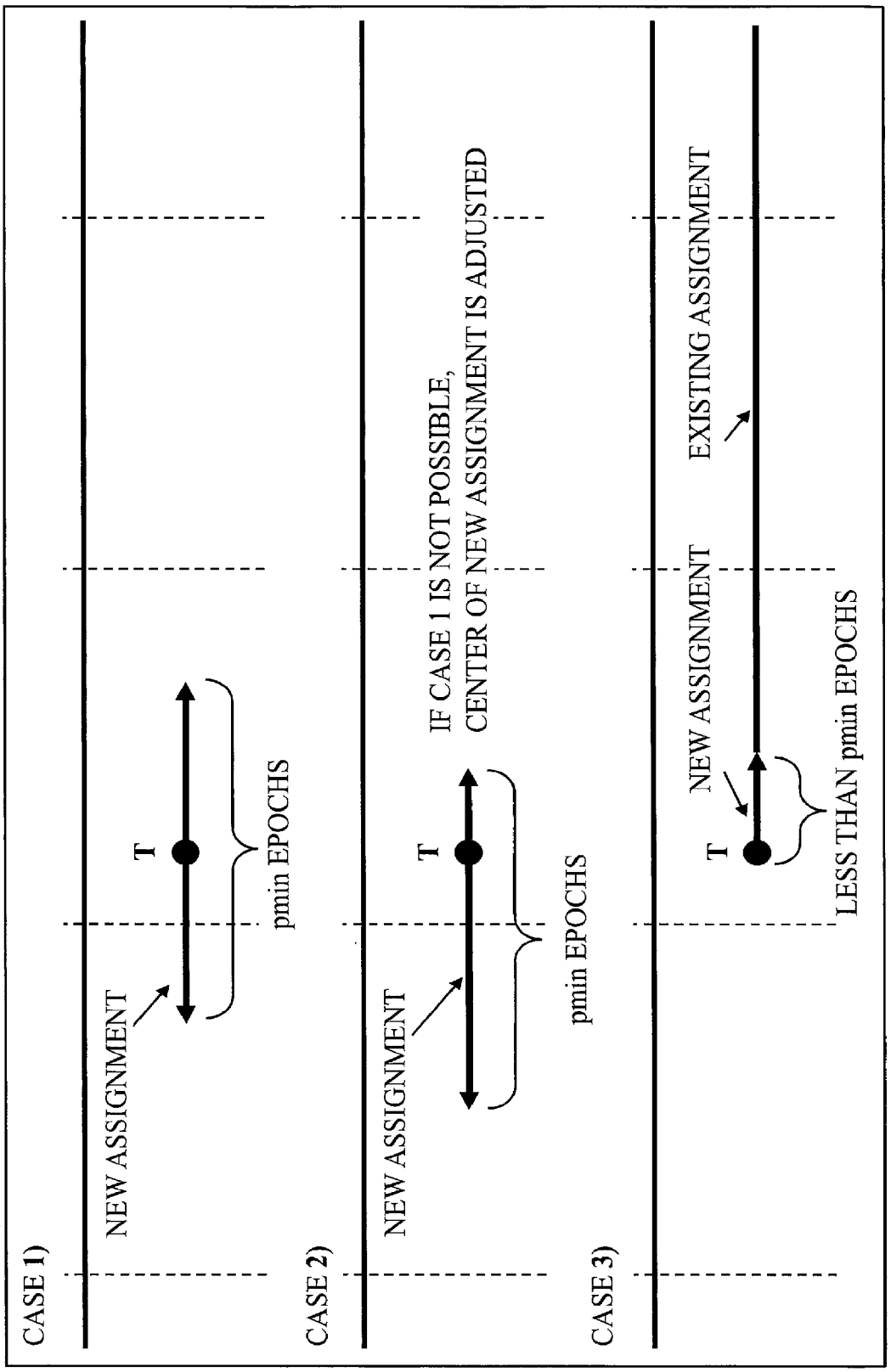

Fig. 10

| CONDITION | FOR COMMON-SATELLITE CONFINED ADDITION | FOR COMMON-SATELLITE EXPANSION |
|---|---|---|
| NUMBER OF SATELLITES FOR EPOCHS is LESS THAN Msat | ✓ | ✓ |
| ANGLE OF ELEVATION OF SATELLITE TO BE ADDED is EQUAL TO OR GREATER THAN MINIMUM | ✓ | ✓ |
| SATELLITE TO BE ADDED is INCLUDED IN COMMON SATELLITES | ✓ | - |
| SATISFACTION OF CONSTRAINT CONDITION C7 IN AREA | ✓ | ✓ |
| SATISFACTION OF CONSTRAINT CONDITION C7 IN ALL AREAS | - | ✓ |

Fig. 12

| Algorithm COMMON-SATELLITE CONFINED ALTERATION |
|---|
| Input: TIME INDEX T, AREA A, INTEGRITY INFORMATION I, PLAN P |
| Output: PLAN P, ADDITION TO ALTERNATIVE REQUEST LIST |
| 1:   for TWO AREAS AS OBJECTS |
| 2:     for sv $\in AS_{T,A} \leftarrow P_T$ |
| 3:       if sv DOES NOT SATISFY QUALITY CONDITIONS |
| 4:         [$sv_{alternate}$, dT] $\leftarrow$ ALTERNATIVE SATELLITE SELECTION end |
| 5:       if $sv_{alternate}$ EXISTS |
| 6:         SUBSTITUTE $sv_{alternate}$ FOR sv FROM $P_{T,A}$ TO $P_{T+dT,A}$ |
| 7:       else ADD sv TO ALTERNATIVE REQUEST LIST end |
| 8:     end |
| 9:   end |

Fig. 14

| Algorithm COMMON-SATELLITE ALTERATION |
|---|
| Input: ALTERNATIVE REQUEST LIST, TIME INDEX T, INTEGRITY INFORMATION I, ORBIT INFORMATION O, PLAN P<br>Output: PLAN P |
| 1: $List_{notuse} \leftarrow []$ |
| 2: for $sv \in$ ALTERNATIVE REQUEST LIST |
| 3:   if SATELLITE $sv_{alternate}$ AS ALTERNATIVE TO SATELLITE sv EXISTS |
| 4:     DELETE sv FROM $AS_{T+1:T+pmin, A}$ FOR ALL AREAS, ADD sv TO $List_{notuse}$ |
| 5:   end |
| 6: while NUMBER OF COMMON SATELLITES FOR $T : T + pmin$ IS LESS THAN Nsat or $List_{notuse} \neq []$ |
| 7:   DELETE SATELLITE HAVING THE HIGHEST QUALITY FROM $List_{notuse}$ |
| 8:   $P_{T+1:T+pmin} \leftarrow$ COMMON-SATELLITE EXPANSION (O, $P_{T+1:T+pmin}$, $List_{notuse}$) |
| 9: end |
| 10: for all AREAS A |
| 11:   $List_{notuse} \leftarrow$ SATELLITES NOT GOOD IN QUALITY AT TIME T (DESCENDING ORDER) |
| 12:   while NUMBER OF SATELLITES FOR $T : T + pmin$ IS LESS THAN Msat or $List_{notuse} \neq []$ |
| 13:     DELETE SATELLITE HAVING THE HIGHEST QUALITY FROM $List_{notuse}$ |
| 14:     $P_{T:T+pmi} \leftarrow$ COMMON-SATELLITE CONFINED ADDITION (O, A, $P_{T+1:T+pmin}$, $List_{notuse}$) |
| 15:   end |
| 16: end |

POSITIONING AUGMENTATION DEVICE, POSITIONING AUGMENTATION SYSTEM, AND POSITIONING AUGMENTATION METHOD

TECHNICAL FIELD

The present invention relates to a positioning augmentation device, a positioning augmentation system, and a positioning augmentation method.

BACKGROUND ART

In positioning with use of satellites, generally, a positioning result of better quality may be obtained with improvement in quality of observed values of distances between the satellites and a receiver and with increase in a number of available satellites. In order that the quality of the observed values of the distances for users may be improved, in recent years, a scheme has been put to practical use in which all or some of error states according to factors such as satellite clock error, orbit error, inter-signal bias, ionospheric delay, and tropospheric delay are estimated with use of the observed distance values of reference stations whose coordinate values have been known and are provided as augmentation information. In Japan as well, research on transmission of the augmentation information from a quasi-zenith satellite has been conducted in order to make accurate positioning broadly available.

In recent years, development and improvement in performance of satellite positioning systems have been carried on in various countries all around the world. In addition to modernization of satellite systems and ground systems in GPS of USA and GLONASS of Russia, development of Galileo of Europe, Beidou of China, and IRNSS of India have been being carried out. In Japan, the first quasi-zenith satellite was launched in 2010 and it has been determined that QZSS with a four-satellite constellation is to be constructed in 2018 and that QZSS with a seven-satellite constellation is to be constructed around 2023. In cooperation among above, it is anticipated that a number of generally available positioning satellites will exceed 100 in 2020s and it is expected that convenience of satellite positioning will further increase in combination with accuracy improvement due to error correction described above. The term "GPS" is an abbreviation for Global Positioning System. The term "GLONASS" is an abbreviation for Global Navigation Satellite System. The term "IRNSS" is an abbreviation for Indian Regional Navigational Satellite System. The term "QZSS" is an abbreviation for Quasi-Zenith Satellite System. Satellite positioning systems such as GPS, GLONASS, Galileo, and QZSS are collectively referred to as GNSS. The term "GNSS" is an abbreviation for Global Navigation Satellite System.

Patent Literature 1 discloses a technique related to a train position detecting system in which a satellite positioning system is used. In the technique, reference stations are provided along a railroad line for trains. The reference stations determine satellites that are under little influence of a multipath error. The reference stations transmit a result of determination to a nearby train. An on-board device in the train makes GPS position calculation by preferentially using the satellites that result in small multipath errors at the reference stations.

CITATION LIST

Patent Literature

Patent Literature 1: JP 2010-163118

SUMMARY OF INVENTION

Technical Problem

As one of practical services in QZSS with the four-satellite constellation, a centimeter level positioning augmentation service which is called CLAS and in which L6 signals are used has been being developed. The term "CLAS" is an abbreviation for Centimeter Level Augmentation Service. In CLAS, the augmentation information that enables centimeter level positioning with TIFF within one minute throughout Japan is transmitted from a quasi-zenith satellite. The term "TTFF" is an abbreviation for Time To First Ambiguity Fix. Specifically, CLAS enables positioning with static horizontal accuracy of 6 cm (95%) or less, static vertical accuracy of 12 cm (95%) or less, horizontal accuracy for kinematic applications of 12 cm (95%) or less, and mobile vertical accuracy of 24 cm (95%) or less. A large data volume is required for augmentation for one positioning satellite that enables such accurate and convenient positioning. A bit rate of the L6 signals for the quasi-zenith satellite, however, is 1695 bps. Accordingly, such a constraint of the bit rate makes it impossible to transmit the augmentation information for all the positioning satellites even if available positioning satellites are increased in number by development of multi-GNSS. Therefore, it is conceivable to select satellites to be augmented and to augment the selected satellites instead of uniformly augmenting all visible satellites.

In the technique disclosed in Patent Literature 1, the satellites to be used for positioning in a train are selected by the reference stations provided along the railroad line for the train. Such a method is not applicable as a method of selecting the satellites to be augmented in order to decrease an amount of the augmentation information that is distributed over a comparatively wide range, rather than a narrow range along the railroad line for trains.

It is an object of the present invention to carefully select satellites to be augmented in accordance with quality of a positioning signal from each satellite.

Solution to Problem

A positioning augmentation device according to an embodiment of the present invention including:

a plan making unit to select a subset satisfying selection conditions from within a candidate set that is a set of satellites being selection candidates and to save plan data indicating the selected subset in a memory;

a plan alteration unit to acquire integrity information indicating quality of a positioning signal transmitted from each satellite, to detect a satellite of which the quality of the positioning signal does not satisfy quality conditions, from within the subset selected by the plan making unit, based on the integrity information, and to modify the plan data saved in the memory into plan data indicating another subset that satisfies the selection conditions by replacing the detected satellite in the subset with another satellite included in the candidate set; and a message generation unit to make satellites, included in the subset indicated by the plan data saved in the memory among the satellites included in the candidate set, objects of positioning augmentation and to generate a message for distribution of augmentation information to be used for the positioning augmentation.

Advantageous Effects of Invention

In the present invention, the satellite of which the quality of the positioning signal does not satisfy the quality conditions is detected from within the set of the satellites selected in advance as the satellites to be augmented and the set of the satellites to be augmented is modified by replacement of the detected satellite with another satellite. According to the present invention, therefore, the satellites to be augmented may be carefully selected in accordance with the quality of the positioning signal from each satellite.

BRIEF DESCRIPTION OF DRAWINGS

FIG. 3 is a table illustrating Sub Type of Compact SSR according to Embodiment 1.

FIG. 5 illustrates pseudo codes for a process of satellite selection according to Embodiment 1.

FIG. 7 illustrates pseudo codes for a process of plan making according to Embodiment 1.

FIG. 9 is a diagram illustrating the concept of adjustment from connecting periods according to Embodiment 1.

FIG. 10 is a table illustrating conditions for additional assignment of a satellite to epochs according to Embodiment 1.

FIG. 12 illustrates pseudo codes for a process of the common-satellite confined alteration according to Embodiment 1.

FIG. 14 illustrates pseudo codes for a process of the common-satellite alteration according to Embodiment 1.

DESCRIPTION OF EMBODIMENTS

Figure 1:
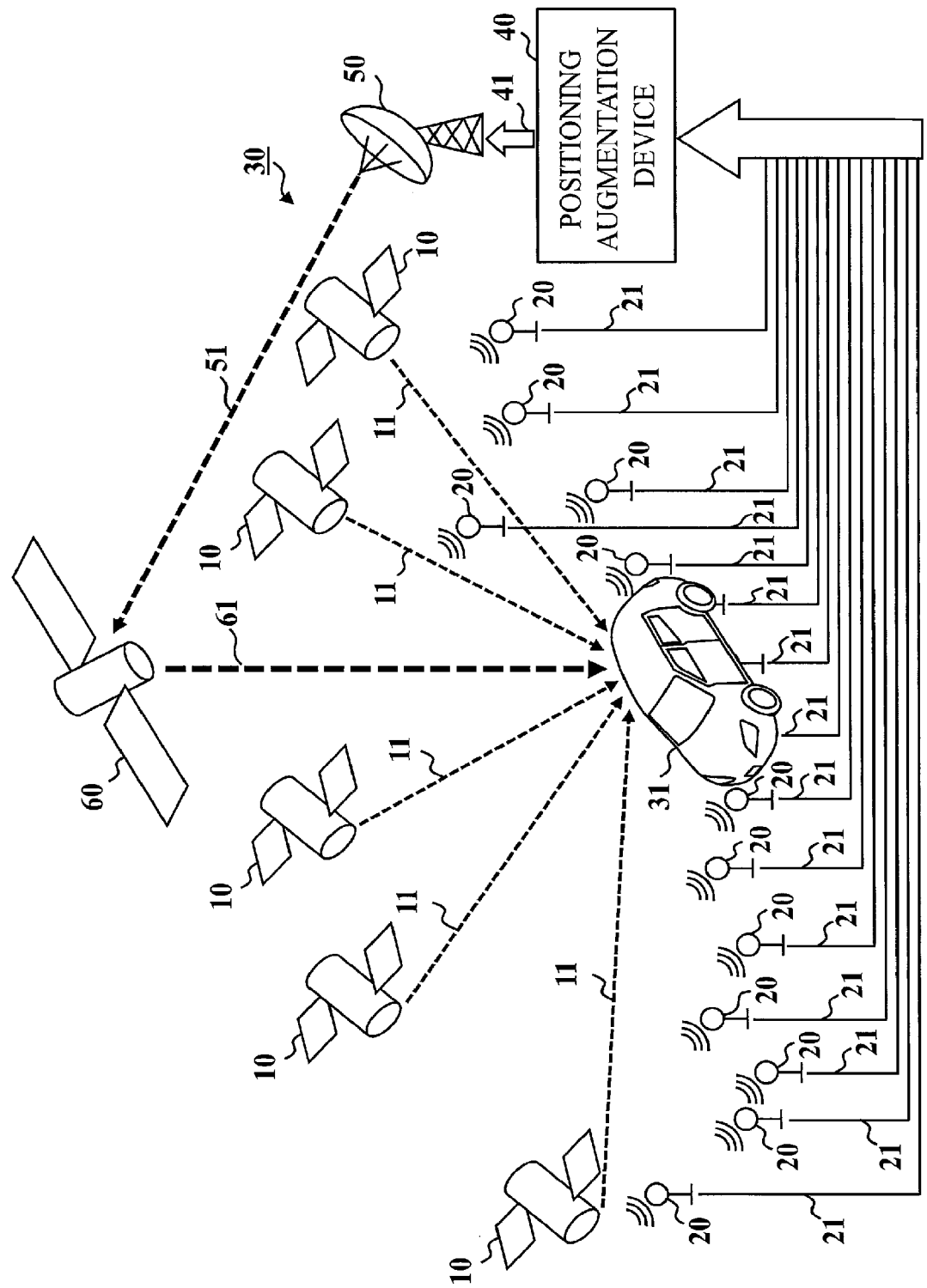
FIG. 1 is a diagram illustrating a configuration of a system according to Embodiment 1.

Hereinbelow, an embodiment of the present invention will be described with use of the drawings. In the drawings, identical parts or corresponding parts are provided with identical characters. In description on the embodiment, description on the identical parts or the corresponding parts are omitted or simplified appropriately. Note that the present invention is not to be limited by the embodiment to be described below but may be modified in various manners as appropriate. For instance, the embodiment to be described below may be partially embodied.

Embodiment 1

The present embodiment will be described with use of FIGS. 1 to 19.
*Description of Configuration*
With reference to FIG. 1, a configuration of a system according to the present embodiment will be described.

The system according to the present embodiment includes a plurality of satellites 10 that belong to any GNSS among GPS, GLONASS, and Galileo and that each transmit a positioning signal 11, a plurality of electronic reference points 20 that are provided in various regions in Japan and that each transmit observed data 21, and a positioning augmentation system 30 that provides CLAS for all over Japan. Some or all of the satellites 10 may belong to a satellite positioning system such as Beidou or IRNSS not described above. Some or all of the electronic reference points 20 may be provided out of Japan. The positioning augmentation system 30 may provide a centimeter level positioning augmentation service equivalent to CLAS for countries or regions other than Japan.

The positioning augmentation system 30 includes a positioning augmentation device 40, a ground station 50, and a quasi-zenith satellite 60. The positioning augmentation device 40 transmits, to the ground station 50, a message 41 for distribution of augmentation information to be used for positioning augmentation. The ground station 50 receives the message 41 from the positioning augmentation device 40 and transmits the message 41 on an uplink signal 51 to the quasi-zenith satellite 60. The quasi-zenith satellite 60 receives the uplink signal 51 from the ground station 50 and distributes the augmentation information by transmitting the message 41, included in the uplink signal 51, on an L6 signal 61. The ground station 50 may be integrated into the positioning augmentation device 40. Instead of the quasi-zenith satellite 60, a satellite of another type or a device provided on ground may distribute the augmentation information. The quasi-zenith satellite 60 may double as the satellite 10.

CLAS is a service by which the augmentation information compatible with RTK-PPP in RTCM SC-104 as a de facto standard of positioning augmentation service is transmitted to territory and territorial waters of Japan with use of the L6 signal 61 from the quasi-zenith satellite 60. The term "RTCM" is an abbreviation for "Radio Technical Commission for Maritime Services". The term "RTK-PPP" is an abbreviation for Real Time Kinematic Precise Point Positioning. The positioning augmentation device 40 generates the augmentation information with use of the observed data 21 on pseudoranges and carrier phases of multiple frequencies obtained from the GNSS Earth Observation Network System of the Geospatial Information Authority of Japan and disclosed position information on the electronic reference points 20 so that users may acquire position information consistent with Japanese geodetic datum through equipment or the like on a moving rover 31. In the augmentation information, information on satellite clock error, satellite orbit error, inter-satellite-signal bias, ionospheric delay, and tropospheric delay is included. As the information on the inter-satellite-signal bias, information for which integer ambiguity may be recovered on a user side is included. As the information on the ionospheric delay, STEC, which is a total number of electrons along a line of sight, is included for each satellite 10. The term "STEC" is an abbreviation for Slant TEC. The term "TEC" is an abbreviation for Total Electron Content. As the information on the tropospheric delay, information on the delay in a vertical direction is included for dry delay and wet delay. The augmentation information is designed so that a user may carry out centimeter level positioning within one minute after starting reception of the augmentation information. The "one minute" is broken down into 30 seconds for the reception and 30 seconds for conversion of the ambiguity into integer. Though any format may be used as a format of the message 41 including the augmentation information, the format in the present embodiment complies with Compact SSR message into which SSR message of RTCM STANDARDS 10403.x section 3.5.12 is downsized for satellite transmission. Compact SSR corresponds to Type 4073.

Figure 2:
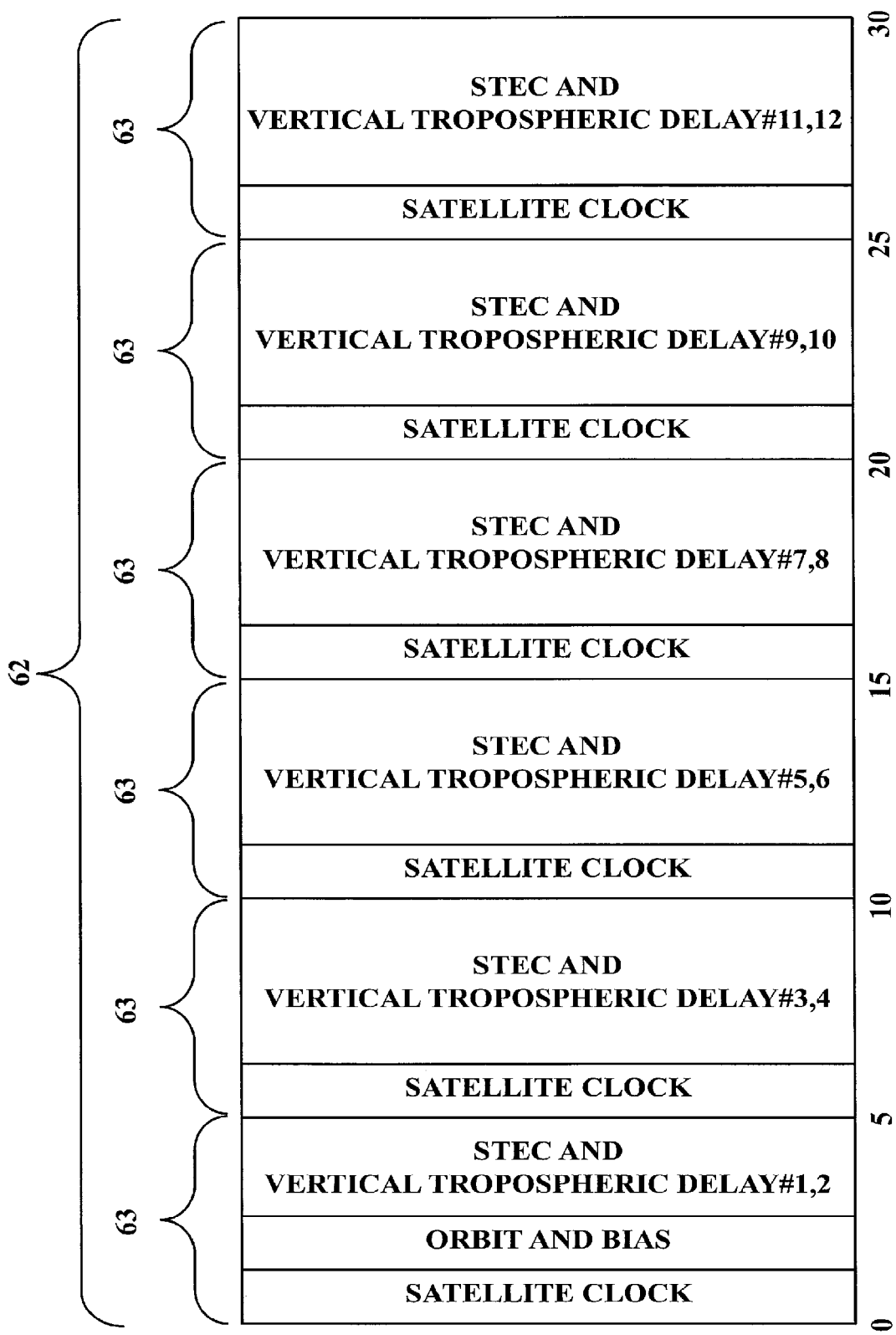
FIG. 2 is a diagram illustrating contents of augmentation information according to Embodiment 1.

Contents of the augmentation information are illustrated in FIG. 2. The augmentation information has a configuration in which a chunk for 30 seconds makes a main frame 62 and in which a chunk for 5 seconds makes a sub-frame 63. As illustrated in FIG. 3, a message corresponding to contents of each sub-frame 63 is made of Sub Type of Compact SSR. A message (Sub Type 3) on the satellite clock error that exhibits quick temporal variation is transmitted in a cycle of five seconds. Messages (Sub Type 2, Sub Type 6, Sub Type 8, and Sub Type 9, or Sub Type 2, Sub Type 4, Sub Type 5, Sub Type 8, and Sub Type 9) on the other error factors are transmitted in a cycle of 30 seconds. For the ionospheric delay (Sub Type 8 and a portion of Sub Type 9) and the tropospheric delay (another portion of Sub Type 9) that differ among places of users, whole of Japan is partitioned into twelve areas and nine remote islands and a transmission for every two areas is made with timing shifted by five seconds so that the users may acquire the information in latest conditions. The nine remote islands are allocated to six sub-frames 63. With regard to ionospheric layers, the information on the ionospheric delay for each satellite along the line of sight on grids defined with about 50 km intervals throughout Japan is transmitted with separation into a polynomial (Sub Type 8) for each area and a residual (a portion of Sub Type 9) from the polynomial at each grid. A total number Ngrid of the grids including grids of the remote islands is 344. With regard to troposphere, the information (another portion of Sub Type 9) on amounts of the dry and wet delays in the vertical direction at the same grids as the grids for the ionospheric layers is transmitted. Bit counts of the information from Sub Type 2 to Sub Type 9 reflect a numerical resolution and a range of numbers that are required for maintenance of accuracy that enables the conversion of the ambiguity into integer within 30 seconds after a user completes reception of a series of messages illustrated in FIG. 3.

Visibility status of the satellites 10 differs according to places. Therefore, a combination of the satellites 10 to be used for correction of STEC is changed for each of the twelve areas and the nine remote islands described above and a resultant union makes common satellites for correction of the errors caused by the satellites 10 for each main frame 62. A number of satellites for each area or for each remote island is denoted by Msat and a number of the common satellites is denoted by Nsat. On an assumption that Sub Type 1 for number association for the satellites 10 is transmitted in a cycle of five seconds and that Sub Type 7 is transmitted in a cycle of 30 seconds, total bit counts will be described below. As a variable term, it is assumed that Sub Type 2 uses 49 bits, that Sub Type 8 uses 54 bits, and that Sub Type 9 uses 7 bits for the grids in the twelve areas and 16 bits for the nine remote islands. Due to necessity of Sub Type 8 for each area and necessity of Sub Type 9 for each area and for each remote island, the total bit counts for every 30 seconds are represented by following expressions:

| | |
|---|---|
| {49+(61+Nsat*Nsig)*Nsys}*6+: | Sub Type 1 |
| 37+49*Nsat+: | Sub Type 2 |
| {37+15*Nsat}*6+: | Sub Type 3 |
| 37+28*Nsig*Nsat+: | Sub Type 6 |
| 37+6*Nsat+: | Sub Type 7 |
| {44+Nsat+54*Msat}*12+: | Sub Type 8 |
| {57+Nsat}*(12+9)+: | header of Sub Type 9 |
| (17+7*Msat)*(Ngrid−9)+(17+16*Msat)*9: | data of Sub Type 9 |

Sub Type 10 is ignored. Nsig denotes a number of signals that are different in frequency and Nsys denotes a number of GNSS. On premises of the augmentation of three frequencies and of GPS, QZSS, GLONASS, and Galileo, that is, Nsig=3 and Nsys=4, conditions of Nsat=14 and Msat=11, for instance, make the total 48847 bits, below 50850 bits (=1695×30) that is a maximum bit count for 30 seconds. A margin in the total bit count with respect to the maximum bit count for 30 seconds is based on consideration of avoidance of a stride of a message over sub-frames 63 and unsteady information provision in Sub Type 10.

Figure 4:
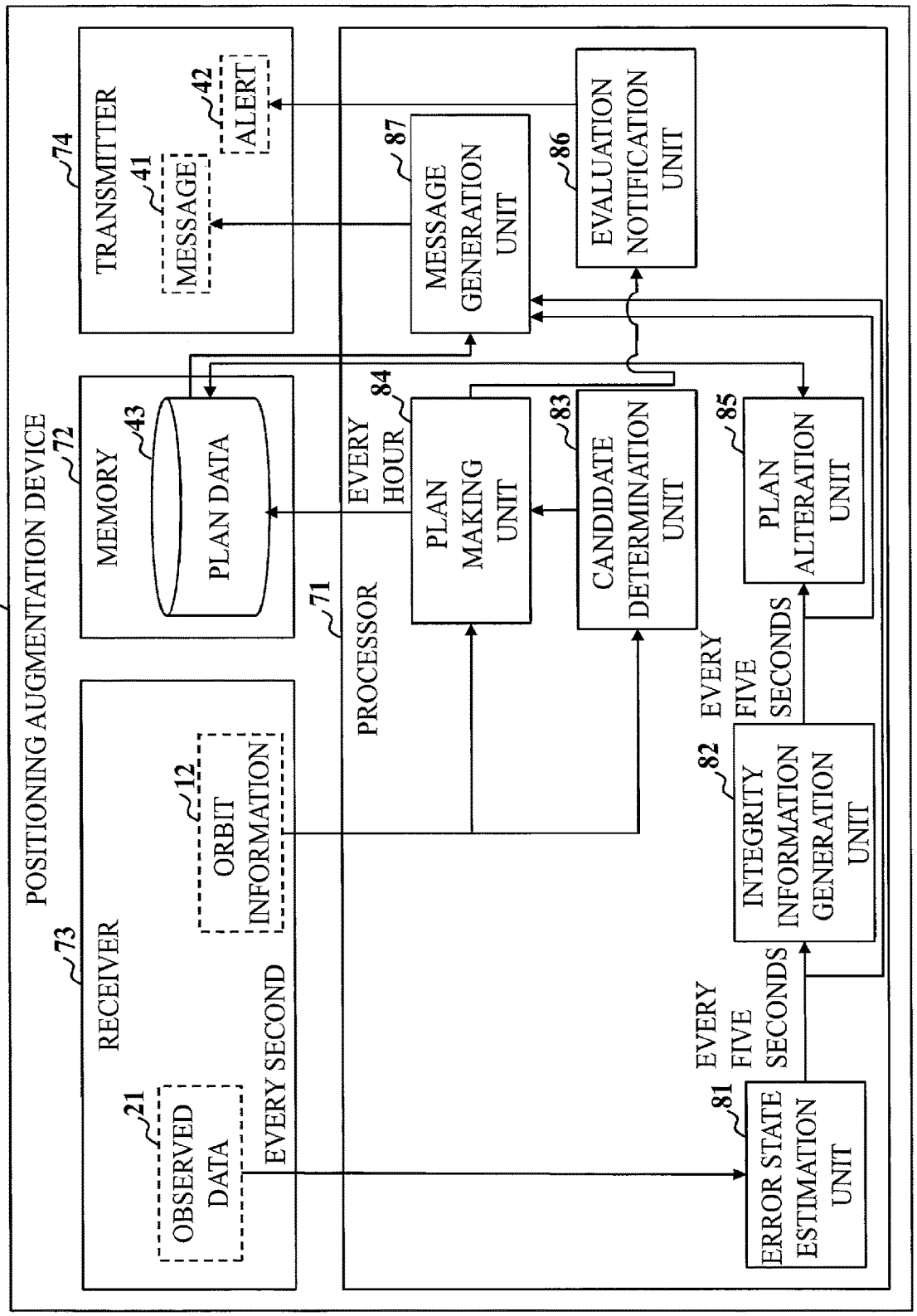
FIG. 4 is a block diagram illustrating a configuration of a positioning augmentation device according to Embodiment 1.

With reference to FIG. 4, a configuration of the positioning augmentation device 40 according to the present embodiment will be described.

The positioning augmentation device 40 is a computer. The positioning augmentation device 40 includes a processor 71 and other hardware such as a memory 72, a receiver 73, and a transmitter 74. The processor 71 is connected to the other hardware through signal lines in order to control the other hardware.

The positioning augmentation device 40 includes an error state estimation unit 81, an integrity information generation unit 82, a candidate determination unit 83, a plan making unit 84, a plan alteration unit 85, an evaluation notification unit 86, and a message generation unit 87, as functional elements. Functions of the error state estimation unit 81, the integrity information generation unit 82, the candidate determination unit 83, the plan making unit 84, the plan alteration unit 85, the evaluation notification unit 86, and the message generation unit 87 are implemented by software.

The processor 71 is an IC that carries out various processes. The term "IC" is an abbreviation for Integrated Circuit. The processor 71 is a CPU, for instance. The term "CPU" is an abbreviation for Central Processing Unit.

The memory 72 is a medium that stores data such as plan data 43 to be described later. The memory 72 is a flash memory or a RAM, for instance. The term "RAM" is an abbreviation for Random Access Memory.

The receiver 73 is a device that receives the observed data 21 described above and data such as orbit information 12 to be described later. The transmitter 74 is a device that transmits the message 41 described above and data such as an alert 42 to be described later. The receiver 73 and the transmitter 74 may be integrated. The receiver 73 and the transmitter 74 or a combination of those is communication chips or NICs, for instance. The term "NIC" is an abbreviation for Network Interface Card.

The positioning augmentation device 40 may include an input device and a display as hardware. The input device is a mouse, a keyboard, or a touch panel, for instance. The display is an LCD, for instance. The term "LCD" is an abbreviation for Liquid Crystal Display.

In the memory 72, a positioning augmentation program is stored. The positioning augmentation program is a program that implements the functions of the error state estimation unit 81, the integrity information generation unit 82, the candidate determination unit 83, the plan making unit 84, the plan alteration unit 85, the evaluation notification unit 86, and the message generation unit 87. The positioning augmentation program is read into the processor 71 and is executed by the processor 71. An OS is also stored in the memory 72. The term "OS" is an abbreviation for Operating System. The processor 71 executes the positioning augmentation program while executing the OS. A portion or the whole of the positioning augmentation program may be integrated into the OS.

The positioning augmentation program and the OS may be stored in an auxiliary storage device. The auxiliary storage device is a flash memory or an HDD, for instance. The term "HDD" is an abbreviation for Hard Disk Drive. The positioning augmentation program and the OS stored in the auxiliary storage device are loaded into the memory 72 and are executed by the processor 71.

The positioning augmentation device 40 may include a plurality of processors as an alternative to the processor 71. The plurality of processors share execution of the positioning augmentation program. Each of the processors is an IC that carries out various processes, as with the processor 71.

Information, data, signal values, and variable values that indicate results of processes in the error state estimation unit 81, the integrity information generation unit 82, the candidate determination unit 83, the plan making unit 84, the plan alteration unit 85, the evaluation notification unit 86, and the message generation unit 87 are stored in the memory 72, the auxiliary storage device, or a register or a cache memory in the processor 71.

The positioning augmentation program may be stored in a portable storage medium such as a magnetic disc and an optical disc.

*Description of Operation*

With reference to FIG. 4, operation of the positioning augmentation device 40 according to the present embodiment will be described. The operation of the positioning augmentation device 40 corresponds to a positioning augmentation method according to the present embodiment.

The error state estimation unit 81 receives the observed data 21 from the plurality of electronic reference points 20 through the receiver 73 every fourth unit time. Though the fourth unit time may be any unit time, the fourth unit time in the present embodiment is one second. The error state estimation unit 81 estimates an error state of the positioning signal 11 transmitted from each of the satellites 10 based on the received observed data 21. The error state estimation unit 81 outputs a result of estimation every third unit time. Though the third unit time may be any unit time as long as being equal to or longer than the fourth unit time, the third unit time in the present embodiment is as long as the sub-frame 63, that is, five seconds.

The integrity information generation unit 82 generates integrity information based on the result of the estimation outputted from the error state estimation unit 81. The integrity information is information indicating quality of the positioning signal 11 transmitted from each of the satellites 10. The integrity information generation unit 82 outputs the generated integrity information every the third unit time.

The candidate determination unit 83 receives the orbit information 12 such as almanac and ephemeris from each of the satellites 10 or a server on the Internet through the receiver 73 every any unit time. In the orbit information 12, operational information indicating operation status of each of the satellites 10 is included. That is, the candidate determination unit 83 acquires the operational information. The candidate determination unit 83 determines a candidate set that is a set of satellites 10 being selection candidates, based on the operational information. Specifically, when the operational information indicates that a satellite 10 is in unhealthy status, the candidate determination unit 83 excludes the satellite 10 from the candidate set. When the operational information indicates that a satellite 10 is in unstable status due to elapse of only several days or tens of days from launch thereof or the like, the candidate determination unit 83 excludes such a satellite 10 from the candidate set.

The plan making unit 84 selects a subset satisfying selection conditions, from within the candidate set determined by the candidate determination unit 83. The plan making unit 84 saves, in the memory 72, the plan data 43 indicating the selected subset. The candidate set does not have to be determined by the candidate determination unit 83 and may be determined out of the positioning augmentation device 40 or may be fixed in advance, for instance. That is, the positioning augmentation device 40 may lack the candidate determination unit 83.

In the present embodiment, the plan making unit 84 selects the subset satisfying the selection conditions, in accordance with angle of elevation of the satellites 10 included in the candidate set and accuracy deterioration due to an arrangement of the satellites 10.

In the present embodiment, the plan making unit 84 selects the subset for every second unit time, as the subset satisfying the selection conditions, every first unit time made of a plurality of the second unit times. Though the second unit time may be any unit time as long as being equal to or longer than the third unit time, the second unit time in the present embodiment is as long as the main frame 62, that is, 30 seconds. Though the first unit time may be any unit time as long as being longer than the second unit time, the first unit time in the present embodiment is one hour.

In the present embodiment, the plan making unit 84 selects the subset satisfying the selection conditions, for each of a plurality of areas to which the augmentation information is distributed. Though the plurality of areas may be any areas, the plurality of areas in the present embodiment are the twelve areas described above.

The plan alteration unit 85 acquires the integrity information from the integrity information generation unit 82. The plan alteration unit 85 detects a satellite 10 of which the quality of the positioning signal 11 does not satisfy quality conditions, from within the subset selected by the plan making unit 84, based on the acquired integrity information. Upon detection of such a satellite 10, the plan alteration unit 85 replaces the detected satellite 10 in the subset with another satellite 10 included in the candidate set and thereby modifies the plan data 43 saved in the memory 72 into plan data 43 indicating another subset that satisfies the selection conditions. The integrity information does not have to be generated by the integrity information generation unit 82 and may be generated out of the positioning augmentation device 40, for instance. That is, the positioning augmentation device 40 may lack the error state estimation unit 81 and the integrity information generation unit 82.

In the present embodiment, the plan alteration unit 85 selects another satellite 10 mentioned above with a preference for satellites 10 included in a union of the subsets for all the areas selected by the plan making unit 84 over the remaining satellites 10 included in the candidate set.

The message generation unit 87 makes the satellites 10, included in the subset indicated by the plan data 43 saved in the memory 72 among the satellites 10 included in the candidate set, objects of positioning augmentation and generates the message 41 for the distribution of the augmentation information to be used for the positioning augmentation.

In the present embodiment, the message generation unit 87 transmits the message 41 through the transmitter 74 to the quasi-zenith satellite 60 via the ground station 50. The message generation unit 87 may directly transmit the message 41 to the quasi-zenith satellite 60.

The evaluation notification unit 86 makes an evaluation of the accuracy deterioration due to the arrangement of the satellites 10 included in the subset selected by the plan making unit 84. The evaluation notification unit 86 notifies an operator of a result of the evaluation.

In the present embodiment, the evaluation notification unit 86 calculates an average for the first unit time of PDOP of the satellites 10 included in the subset selected by the plan making unit 84 for each area. The term "PDOP" is an abbreviation for Position DOP. The term "DOP" is an abbreviation for Dilution of Precision. In case where the average calculated for the subset for any area exceeds an upper limit, the evaluation notification unit 86 transmits the alert 42, indicating an ID for identification of the area and at least either of a result of calculation of the PDOP or a fact that the PDOP has an anomalous value, to the operator through the transmitter 74. The term "ID" is an abbreviation for Identifier. The operator may pursue optimization of selection of the satellites by manually modifying the candidate set or the integrity information based on contents of the alert 42.

With reference to FIGS. 5 to 14, the operation of the positioning augmentation device 40 according to the present embodiment will be further described.

A plan of the combination of the satellites 10 is made by the plan making unit 84 in quasi-real-time with use of a geometrical arrangement based on the orbit information 12 as an evaluation index. The integrity information obtained in real time for each combination of the satellites 10 and the areas is reflected in the plan by the plan alteration unit 85, so that the combination of the satellites 10 is determined for every main frame 62 of 30 seconds. The integrity information is quality information on observed values corrected on the errors for each of the satellites 10 and is an evaluation of ranging accuracy. Estimation of the error state and generation of the integrity information are respectively carried out by the error state estimation unit 81 and the integrity information generation unit 82, irrespective of the combination of the satellites 10 to be augmented. The error states of and the integrity information on the satellites 10 included in the determined combination are extracted and transmitted as the augmentation information by the message generation unit 87. In the four-satellite constellation, a plurality of quasi-zenith satellites 60 transmit the same augmentation information in order to ensure availability of CLAS.

FIG. 5 illustrates pseudo codes for a process of satellite selection. The process of the satellite selection is called every five seconds corresponding to generation of the subframe 63 of the augmentation information. In the process of the satellite selection, a combination $CS_T$ of the common satellites for the correction of the errors caused by the satellites is determined in accordance with the plan. In the selection of the satellites 10 for each area, in case where any satellite 10 that does not satisfy the quality conditions in the area is included in the plan, the combinations at current time and at subsequent time and later for the area are altered insofar as the common satellites are not changed. This process is referred to as a process of common-satellite confined alteration. In case where the alteration may not be attained insofar as the common satellites are not changed, the plans at the subsequent time and later are altered with changes in the common satellites. This process is referred to as a process of common-satellite alteration. For the remote islands, a combination of satellites 10 that number in Msat and that minimize PDOP is selected from within satellites 10 satisfying the quality conditions among the satellites 10 included in $CS_T$. In case where the satellites 10 satisfying the quality conditions number in less than Msat, other satellites 10 are allocated to a shortfall in descending order of the quality. In case where the current time is ten minutes before subsequent hour on the hour, the plan for one hour is made with setting of the subsequent hour on the hour as initial time. This process is referred to as a process of plan making.

The process of the plan making is carried out by the plan making unit 84. The processes of the common-satellite confined alteration and of the common-satellite alteration are carried out by the plan alteration unit 85.

With reference to FIGS. 6 to 10, details of the process of the plan making will be described.

The plan making unit 84 makes the plan for one hour with setting of every hour on the hour as the initial time once an hour by using the orbit information 12 obtained at ten minutes before the hour. The combination is made for every main frame 62 described above of 30 seconds and thus the combinations at 120 times are determined for one hour. At one of the times, the combinations of the Msat of satellites and differing among the areas and the combination of the Nsat of satellites and being the common satellites are determined. By the candidate determination unit 83, information on maintenance operation and checkout operation for each GNSS, which is included in the orbit information 12, is reflected and only satellites 10 in steady operation status are determined as the selection candidates. In the present embodiment, the candidate determination unit 83 determines only satellites 10 with the angles of elevation equal to or greater than 15 degrees at specified four corners of the area, as the selection candidates for the area. Making of the plan for one hour with use of the geometrical arrangement as the evaluation index is represented as an optimization problem below.

Evaluation function $F$: FORMULA 1

$$\arg\min_{A,T} \max PDOP(z^{GPS}_{1:n_{GPS},A,T}, z^{Gal}_{1:n_{Gal},A,T}, z^{GLO}_{1:n_{GLO},A,T})$$

-continued

Where $z^{GPS}_{sv,A,T}(sv = 1, \ldots, n^{GPS}; A = 1, \ldots,$
$\qquad 12; T = T_{hour}, \ldots, T_{hour+119}) \in \{0, 1\}$ $z^{Gal}_{sv,A,T}(sv = 1, \ldots, n^{Gal}; A = 1, \ldots, 12;$
$\qquad T = T_{hour}, \ldots, T_{hour+119}) \in \{0, 1\}$ $z^{GLO}_{sv,A,T}(sv = 1, \ldots, n^{GLO}; A = 1, \ldots, 12;$
$\qquad T = T_{hour}, \ldots, T_{hour+119}) \in \{0, 1\}$ T is an index of time in units of 30 seconds. $T_{hour}$ is the initial time of the pertinent one hour, that is, the hour. Under a condition of $z^{GPS}_{sv,A,T}=1$, the GPS satellite with a number sv becomes an object to be augmented for an area A and at time T. Under a condition of $z^{Gal}_{sv,A,T}=1$, the Galileo satellite with the number sv becomes the object to be augmented for the area A and at the time T. Under a condition of $z^{GLO}_{sv,A,T}=1$, the GLONASS satellite with the number sv becomes the object to be augmented for the area A and at the time T. The quasi-zenith satellite 60 is included in the GPS satellites, because of compatibility. $n^{GPS}$, $n^{Gal}$, and $n^{GLO}$ respectively denote numbers of satellites 10 included in GPS, Galileo, and GLONASS. An evaluation function F is a function that minimizes a maximum value for all the areas and all the times of PDOP of the satellites 10 to be augmented for each area A and at each time T, under constraint conditions below.

Constraint condition C1: FORMULA 2

$$\sum_{sv=1}^{n^{GPS}} z^{GPS}_{sv,A,T} + \sum_{sv=1}^{n^{Gal}} z^{Gal}_{sv,A,T} + \sum_{sv=1}^{n^{GLO}} z^{GLO}_{sv,A,T} \leq Msat(\forall A, T)$$

Constraint condition C2:

$$\sum_{sv=1}^{n^{GPS}} \max\left(\sum_{A=1}^{12} z^{GPS}_{sv,A,T}, 1\right) + \sum_{sv=1}^{n^{Gal}} \max\left(\sum_{A=1}^{12} z^{Gal}_{sv,A,T}, 1\right) + \sum_{sv=1}^{n^{GLO}} \max\left(\sum_{A=1}^{12} z^{GLO}_{sv,A,T}, 1\right) \leq Nsat(\forall T)$$

Constraint condition C3:

$$\sum_{sv=1}^{n^{GPS}} z^{GPS}_{sv,A,T} \geq Nhigh(\forall sv, A, T \text{ s.t. } sv^{GPS}_{A,T} \in high)$$

Constraint condition C4:

$$\sum_{\tau=T^{-GPS}_{sv,A,T}}^{T^{+GPS}_{sv,A,T}} z^{GPS}_{sv,A,T+\tau} \geq p\min (\forall sv, A, T \text{ s.t. } z^{GPS}_{sv,A,T} = 1)$$

Constraint condition C5:

$$\sum_{\tau=T^{-Gal}_{sv,A,T}}^{T^{+Gal}_{sv,A,T}} z^{Gal}_{sv,A,T+\tau} \geq p\min (\forall sv, A, T \text{ s.t. } z^{Gal}_{sv,A,T} = 1)$$

Constraint condition C6:

$$\sum_{\tau=T^{-GLO}_{sv,A,T}}^{T^{+GLO}_{sv,A,T}} z^{GLO}_{sv,A,T+\tau} \geq p\min (\forall sv, A, T \text{ s.t. } z^{GLO}_{sv,A,T} = 1)$$

Constraint condition C7:

$$\sum_{sv=1}^{n^{GPS}} z^{GPS}_{sv,A,T} \neq 1, \sum_{sv=1}^{n^{Gal}} z^{Gal}_{sv,A,T} \neq 1,$$

$$\sum_{sv=1}^{n^{GLO}} z^{GLO}_{sv,A,T} \neq 1(\forall sv, A, T)$$

Constraint condition C8:

$$z^{GPS}_{sv,A,T} = 0(\forall sv, A, T \text{ s.t. } sv^{GPS}_{A,T} \notin cand)$$

Constraint condition C9:

$$z^{Gal}_{sv,A,T} = 0(\forall sv, A, T \text{ s.t. } sv^{Gal}_{A,T} \notin cand)$$

Constraint condition C10:

$$z^{GLO}_{sv,A,T} = 0(\forall sv, A, T \text{ s.t. } sv^{GLO}_{A,T} \notin cand)$$

The constraint condition C1 is a selection condition providing that the total number of the satellites 10 to be augmented for each area A and at each time T is equal to or smaller than Msat. The constraint condition C2 is a selection condition providing that the number of the common satellites at each time T is equal to or smaller than Nsat. The constraint condition C3 is a selection condition providing that the Nhigh or more of GPS satellites having high angles of elevation are to be augmented irrespective of PDOP for convenience in urban areas or the like. For instance, a set of the GPS satellites with the angles of elevation equal to or greater than 40 degrees is treated as a set high of the GPS satellites having the high angles of elevation. The constraint conditions C4 to C6 are selection conditions providing that the GPS satellites, the Galileo satellites, and the GLONASS satellites are to be augmented continuously for pmin epochs or more for decrease in a number of calculations for fixation of the ambiguity on the user side. One epoch represents time as long as the main frame 62, that is, 30 seconds. Under a condition of pmin=10, for instance, pmin epochs are 300 seconds. $T^{GPS}_{sv,A,T}$ is time that precedes the time T and that is immediately before time when $z^{GPS}_{sv,A,T}=0$ initially holds reckoned from the time T. $T^{+GPS}_{sv,A,T}$ is time that is posterior to the time T and that is immediately before time when $z^{GPS}_{sv,A,T}=0$ initially holds reckoned from the time T. On condition that the time T is close to the initial time or end time, however, those times may be times in one hour before or after the pertinent one hour. The same as for the GPS satellites applies to the Galileo satellites and the GLONASS satellites. The constraint condition C7 is a selection condition providing that the number of the satellites 10 to be augmented for each area A and at each time T is two or more or zero for one GNSS. That is, the constraint condition C7 is a selection condition providing that the number of the satellites 10 to be augmented for each GNSS is prevented from being only one. Thus it is made possible for the users to make a single difference calculation between satellites 10 in the same GNSS. The constraint conditions C8 to C10 are selection conditions providing that the satellites 10 to be augmented are selected from among only the satellites 10 that are the selection candidates. In the present embodiment, the candidate set determined by the candidate determination unit 83 is treated as a set cand of the satellites 10 that are the selection candidates.

Figure 6:
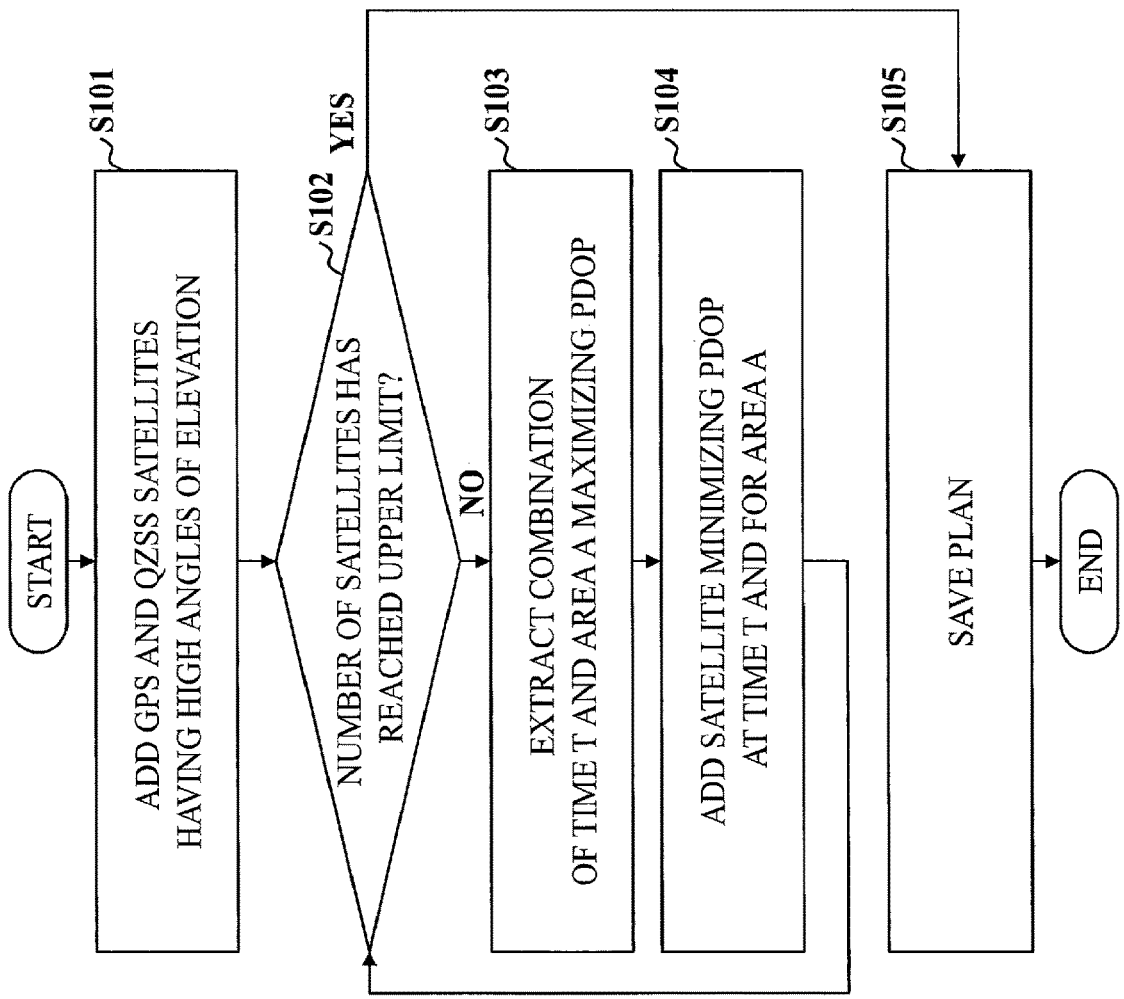
FIG. 6 is a flowchart illustrating a processing procedure of plan making according to Embodiment 1.

FIG. 6 illustrates a flow of the process of the plan making that is called every hour.

Before a process of step S101 is executed, the subsets for the times and the areas are empty.

In step S101, the plan making unit 84 adds GPS satellites and the quasi-zenith satellite 60 that have the angles of elevation equal to or greater than a threshold and that prevent any subset from not satisfying the constraint conditions, from the candidate set cand to the subset for each time and each area.

In step S102, the plan making unit 84 determines whether the number of the satellites 10 included in the subset for each time and each area has reached Nsat or not. In case where the number of the satellites 10 included in any subset has not reached Nsat, a process of step S103 is executed. In case where the number of the satellites 10 included in each of all the subsets has reached Nsat, a process of step S105 is executed.

In step S103, the plan making unit 84 extracts a combination of time T and an area A that maximizes PDOP. That is, the plan making unit 84 identifies a subset $AS_{T,A}$ having the greatest PDOP, among all the subsets.

In step S104, the plan making unit 84 adds a satellite 10 that minimizes PDOP at the time T and for the area A and that prevents any subset from not satisfying the constraint conditions, from the candidate set cand to the subset $AS_{T,A}$ for the time T and the area A and to the subset for each time between the time T and pmin epochs after at maximum and for the area A. After a process of step S104, a process of step S102 is executed again.

In step S105, the plan making unit 84 saves the plan data 43 indicating the subset for each time and each area in the memory 72.

Immediately before step S105 or in parallel with step S105, the evaluation notification unit 86 makes an evaluation of PDOP of the subset for each time and each area. The evaluation notification unit 86 notifies the operator of a result of the evaluation.

In step S101, as described above, the plan making unit 84 executes the first process of selecting, from the candidate set cand, the satellites 10 that have the angle of elevation equal to or greater than the threshold. In the present embodiment, the plan making unit 84 executes the first process for each of the twelve areas.

In steps S102 to S104, the plan making unit 84 iterates a second process of selecting, from the candidate set cand, a satellite 10 that decreases the accuracy deterioration due to the arrangement of the selected satellites 10, as long as the set of the selected satellites 10 satisfies the selection conditions even if a subsequent satellite 10 is selected. In the selection conditions, the constraint condition C1 is included as a condition on the total number of the satellites 10 included in the subset for each area indicated by the plan data 43. In the selection conditions, the constraint condition C2 is further included as a condition on the total number of the satellites 10 included in the union of the subsets for all the areas indicated by the plan data 43.

The plan making unit 84 executes the process of selecting, from the candidate set cand, a satellite 10 that minimizes the accuracy deterioration due to the arrangement of the selected satellites 10, as the second process for peak time T that is the second unit time with the greatest accuracy deterioration due to the arrangement of the selected satellites 10 in the same first unit time at beginning of the second process. The plan making unit 84 executes a third process of selecting a satellite 10 that is the same as the second process for one or more second unit times following the peak time. In the present embodiment, the plan making unit 84 executes the process of selecting, from the candidate set cand, the satellite 10 that minimizes PDOP of the selected satellites 10, as the second process for the combination of the time T and the area A with the greatest PDOP of the selected satellites 10 in the same one hour at the beginning of the second process. The plan making unit 84 executes the third process of selecting the satellite 10 that is the same as the second process, for the times for pmin epochs at maximum that follow the time T.

Hereinbelow, an approximate method for the plan making will be described.

Order of dimensions of a variable z in the optimization problem is $10^4$, considering that the number of the areas of 12, the number of the epochs of 120, and a value of the variable for invisible satellites 10 of zero under the constraint conditions C8 to C10 are brought about and assuming that a number of visible satellites is on the order of 30. Furthermore, it is difficult to strictly find a globally optimal solution because the evaluation function F and the constraint conditions C2 and C4 to C6 are nonlinear. In the present embodiment, therefore, the plan is made with use of an approximate approach based on a greedy method that does not require repeated calculations in consideration of reliability desired for a ground system and calculation resources. FIG. 7 illustrates pseudo codes for the process of the plan making. The pseudo codes are a result of coding of algorithm that is substantially the same as the flow of FIG. 6.

Figure 8:
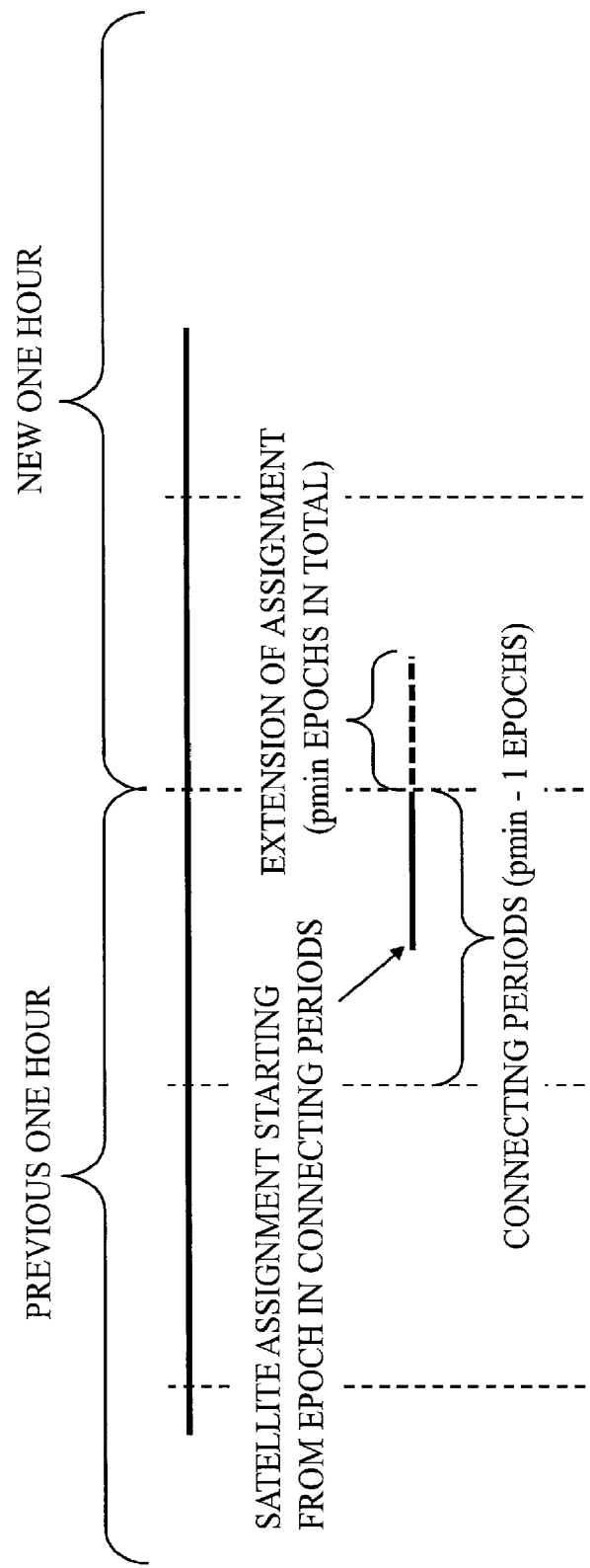
FIG. 8 is a diagram illustrating a concept of adjustment from connecting periods according to Embodiment 1.

Initially, the plan making unit 84 acquires the time index of the subsequent hour on the hour in order to determine a range of one hour for making of the plan. Subsequently, the plan making unit 84 carries out assignment of the Nhigh of GPS satellites, in consideration of the constraint condition C3, independently for each combination of the area and the time, and in descending order of the angle of elevation at the specified four corners of the area. The quasi-zenith satellite 60 is included in the Nhigh of GPS satellites. A case where the GPS satellites with the angles of elevation equal to or greater than 40 degrees as the threshold number in less than Nhigh may occur but may be allowed. Concentration of the allocated satellites 10 in a vicinity of the zenith may be avoided by treatment of only the GPS satellites as the objects. Subsequently, the plan making unit 84 sets pmin−1 epochs reckoned from an end of previous one hour for which the plan has been made, as connecting periods to one hour to be planned in the current process. The plan making unit 84 expands the assignment of each satellite 10 for which the augmentation is started from any of the epochs in the connecting periods toward the one hour to be planned in the current process so that epochs during which the satellite 10 is to be continuously augmented may number in pmin. A concept of a process of adjustment from connecting periods is illustrated in FIG. 8.

Subsequently, the plan making unit 84 carries out the assignment of the satellites 10 based on the greedy method with use of PDOP as the evaluation index. The assignment of the satellites 10 based on the greedy method means to extract the area A and the time T that result in the greatest PDOP from among all the areas and all the times, to newly allocate a satellite 10 that is a selection candidate that minimizes PDOP for the area A and at the time T to the area A and the time T and neighboring times, and to iterate the above under the constraint conditions until addition of a satellite 10 is made impossible. The neighboring times are included in order that the satellite 10 may be augmented continuously for pmin epochs or more. Conditions of the assignment are that time of the continuous assignment includes the time T and is equal to or longer than pmin epochs and that the constraint conditions are satisfied at the times. The continuous time may be made pmin epochs by being connected to another section to which the assignment has been done, through additional assignment. PDOP is calculated with use of average coordinate values of the specified four corners of the area. Initially, the plan making unit 84 expands the common satellites for all the times to an upper limit. After that, the plan making unit 84 carries out the assignment of the satellite 10 within a range of the common satellites until the addition of a satellite 10 is made impossible for each area and all the times. For the extraction of the area A and the time T, the plan making unit 84 considers a number of satellites of each GNSS included in a set of the satellites 10 having been allocated, in addition to the number, less than Msat, of the satellites 10 having been allocated. In case where an area and time exist in which only one satellite 10 is included from any GNSS in the set of the satellites 10 having been allocated, the plan making unit 84 carries out the extraction from only such an area and time. Thus satisfaction of the constraint condition C7 may be brought about. A concept of the addition of the satellite 10 to the time T and the neighboring times of the time T is illustrated in FIG. 9.

As in case 1 or case 2 of FIG. 9, the satellite 10 is added to continuous pmin epochs satisfying conditions of FIG. 10 and including the time T. As in case 3 of FIG. 9, in case where a section to which the same satellite 10 is allocated has already existed on times neighboring the time T, that is, times having epoch differences of pmin or less from the time T and where all epochs between the time T and the section satisfy the conditions of FIG. 10, the satellite 10 is added to those epochs. The plan making unit 84 carries out the assignment of a satellite 10 that minimizes PDOP for the area A and at the time T, among satellites 10 of which such addition may be carried out. In expansion of the common satellites and the addition within the common satellites, time when the satellites number in less than actual upper limits Nsat and Msat may occur due to the constraint conditions C4 to C6. When such time exists, the plan making unit 84 temporarily decreases pmin one epoch by one epoch and iterates a process of the assignment of the satellite 10 until a margin in the number of the satellites disappears or until pmin becomes zero.

Figure 11:
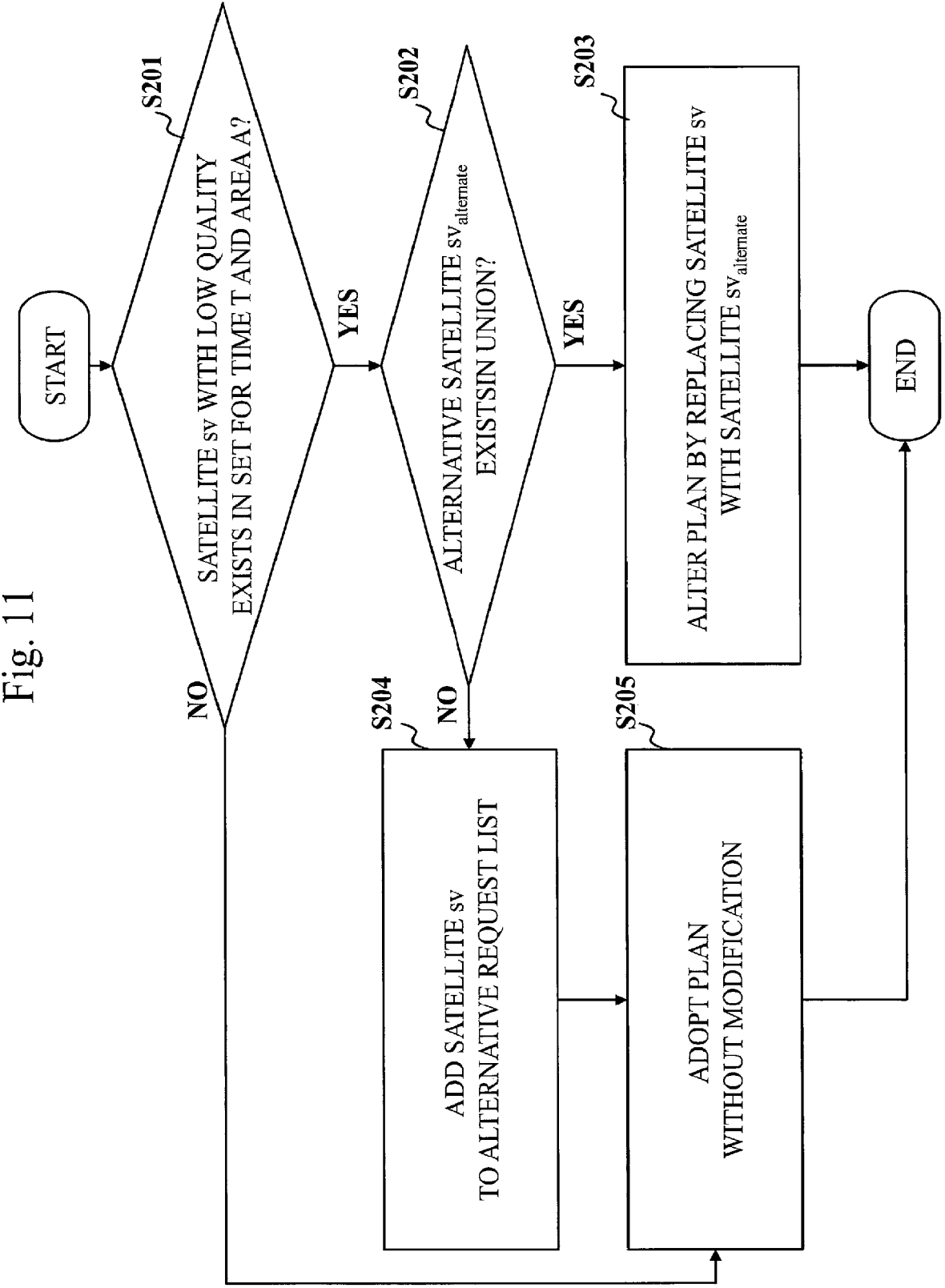
FIG. 11 is a flowchart illustrating a processing procedure of common-satellite confined alteration according to Embodiment 1.

With reference to FIGS. 11 and 12, details of the process of the common-satellite confined alteration will be described.

The combinations of the satellites 10 for the areas are determined every five seconds for every two areas. Ordinarily, the combinations according to the plan are selected. In case where the integrity information obtained in real time indicates that a satellite 10 not satisfying the quality conditions is included in the plan, modification confined by the main frame 62 of 30 seconds and the common satellites is enabled.

FIG. 11 illustrates a flow of the process of the common-satellite confined alteration that is called every five seconds.

Before a process of step S201 is executed, the subsets for the times and the areas have been selected by the plan making unit 84.

In step S201, the plan alteration unit 85 acquires the integrity information. The plan alteration unit 85 determines whether a satellite sv of which the quality of the positioning signal 11 does not satisfy the quality conditions exists or not in the subset selected by the plan making unit 84 for the corresponding time and any of the areas, based on the integrity information. In case where the plan alteration unit 85 detects the satellite sv of which the quality of the positioning signal 11 does not satisfy the quality conditions from within the subset selected by the plan making unit 84 for the corresponding second unit time and the one area A, a process of step S202 is executed. In case of non-detection, a process of step S205 is executed.

In step S202, the plan alteration unit 85 determines whether a satellite $SV_{alternate}$ of which the quality of the positioning signal 11 is higher than that of the detected satellite sv is included or not in a union of the subsets selected by the plan making unit 84 for the corresponding time and all the areas, based on the integrity information. In the present embodiment, the integrity information is information indicating the quality of the positioning signal 11 for each area. When the plan alteration unit 85 determines whether the satellite $sv_{alternate}$ of which the quality of the positioning signal 11 is higher than that of the satellite sv is included or not in one set, the plan alteration unit 85 determines that the satellite $sv_{alternate}$ with the high quality is included in the one set on condition that any satellite 10 of which the quality of the positioning signals 11 for all the areas is higher than that of the satellite sv is included in the one set. In case where the satellite $sv_{alternate}$ with the high quality is included in the union, a process of step S203 is executed. In case where the satellite $sv_{alternate}$ is not included in the union, a process of step S204 is executed.

In step S203, the plan alteration unit 85 modifies the plan data 43 saved in the memory 72 by replacing the detected satellite sv with the satellite $sv_{alternate}$ included in the union and having the high quality in the subset for the area A. When replacing the detected satellite sv with another satellite $sv_{alternate}$ in the subset for the one time T, in the present embodiment, the plan alteration unit 85 replaces the same satellite sv included in the subsets for one or more times following the time T with another satellite $sv_{alternate}$. Then the process of the common-satellite confined alteration is ended.

In step S204, the plan alteration unit 85 adds the detected satellite sv to an alternative request list. The alternative request list is saved in the memory 72. Subsequently, the process of step S205 is executed.

In step S205, the plan alteration unit 85 ends the process of the common-satellite confined alteration without modifying the plan data 43 saved in the memory 72.

FIG. 12 illustrates pseudo codes for the process of the common-satellite confined alteration. The pseudo codes are a result of coding of algorithm that is substantially the same as the flow of FIG. 11.

In case where each satellite sv included in the planned subset $AS_{T, A}$ does not satisfy the quality conditions at the current time T, the plan alteration unit 85 replaces the satellite sv with another satellite $sv_{alternate}$ not included in a subset $AS_{T:T+dT, A}$, for the time T through time T+dT. dT is determined based on the existing assignment of the satellite sv and the satellite $sv_{alternate}$ and is represented by an expression below.

$$dT = \min(\tau 1-1, \tau 2-1, pmin-1)$$

$\tau 1$ is a number of epochs to time when the satellite sv is not included in a subset $AS_{T+\tau 1, A}$ for the first time after the time T. $\tau 2$ is a number of epochs to time when a satellite $sv_{alternate}$ is included in a subset $AS_{T+\tau 2, A}$ for the first time after the time T.

The satellite $sv_{alternate}$ is a satellite 10 having the highest quality among satellites 10 that satisfy the quality conditions at the current time T, that are included in the common satellites $CS_{T:T+dT}$ at all the times between the time T and the time T+dT, that are the selection candidates for the area A, and that satisfy the constraint condition C7 even after the replacement. In case where such a satellite 10 does not exist, the plan alteration unit 85 adds the satellite sv to the alternative request list in order to replace the satellite sv at the subsequent time or later. On condition of dT=τ1−1, that is, on condition that the satellite sv is excluded from the satellites to be augmented for the area A within pmin epochs after the time T, a case where the constraint conditions C4 to C6 are not satisfied because of short duration of the satellite $sv_{alternate}$ may occur but may be allowed. A case where duration of the replaced satellite sv is shorter than pmin epochs may occur but may be allowed.

Figure 13:
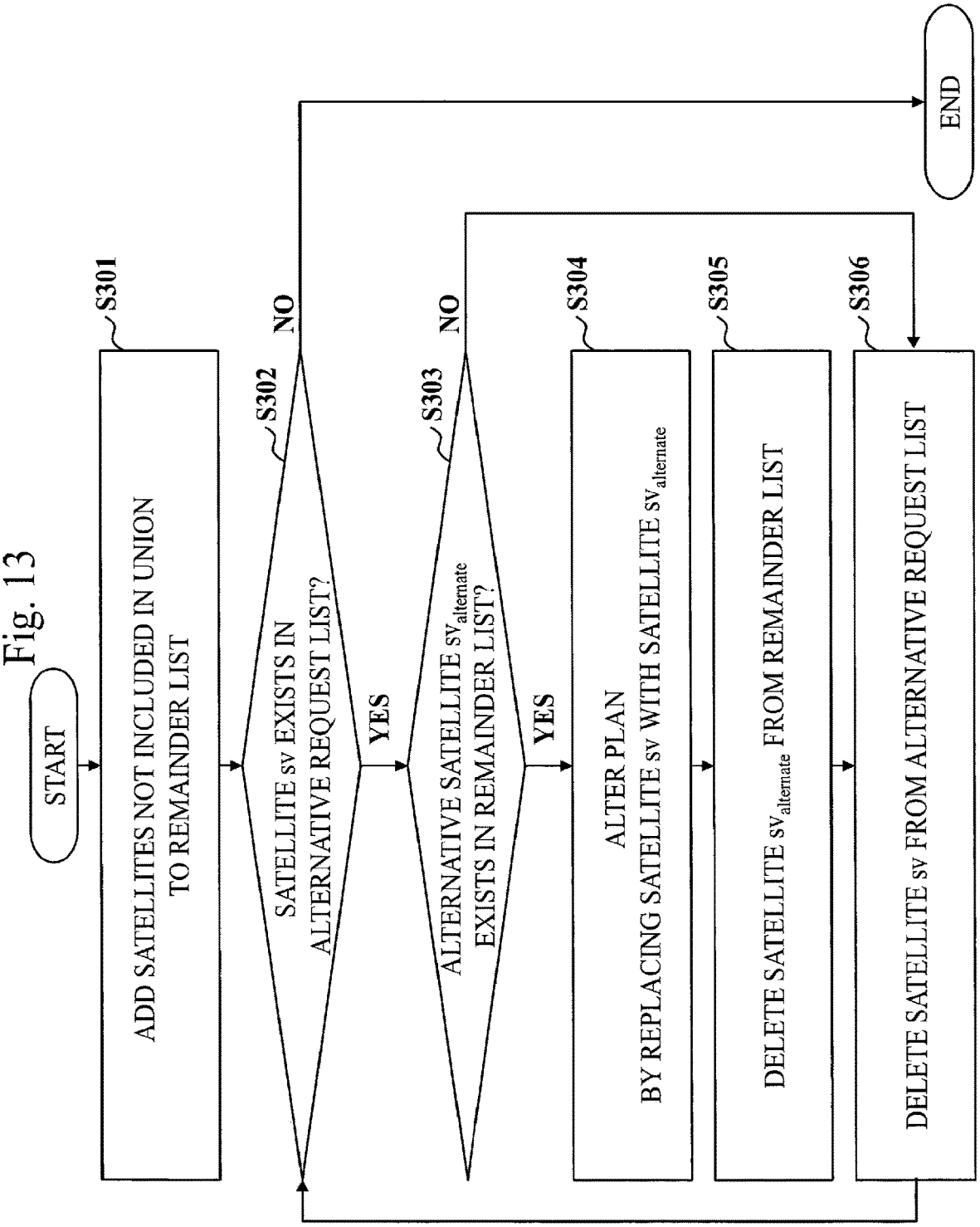
FIG. 13 is a flowchart illustrating a processing procedure of common-satellite alteration according to Embodiment 1.

With reference to FIGS. 13 and 14, details of the process of the common-satellite alteration will be described.

FIG. 13 illustrates a flow of the process of the common-satellite alteration that is called every 30 seconds.

In step S301, the plan alteration unit 85 adds, to a remainder list, satellites 10 that are included in the candidate set cand and that are not included in the union of the subsets for the corresponding time and all the areas. The remainder list is saved in the memory 72.

In step S302, the plan alteration unit 85 determines whether the satellite sv is included or not in the alternative request list saved in the memory 72. In case where the satellite sv is included in the alternative request list, a process of step S303 is executed. In case where the satellite sv is not included in the alternative request list, the process of the common-satellite alteration is ended.

In step S303, the plan alteration unit 85 determines whether the satellite $sv_{alternate}$ of which the quality of the positioning signal 11 is higher than that of the satellite sv included in the alternative request list is included or not in the remainder list saved in the memory 72, based on the integrity information. That is, the plan alteration unit 85 determines whether the satellite $sv_{alternate}$ of which the quality of the positioning signal 11 is higher than that of the satellite sv is included or not in the candidate set cand. In the present embodiment, the integrity information is the information indicating the quality of the positioning signal 11 for each area. When the plan alteration unit 85 determines whether the satellite $sv_{alternate}$ of which the quality of the positioning signal 11 is higher than that of the satellite sv is included or not in one set, the plan alteration unit 85 determines that the satellite $sv_{alternate}$ with the high quality is included in the one set on condition that any satellite 10 of which the quality of the positioning signals 11 for all the areas is higher than that of the satellite sv is included in the one set. In case where the satellite $sv_{alternate}$ with the high quality is included in the candidate set, a process of step S304 is executed. In case where the satellite $sv_{alternate}$ is not included in the candidate set, a process of step S306 is executed.

In step S304, the plan alteration unit 85 modifies the plan data 43 saved in the memory 72 by replacing the satellite sv with the satellite $sv_{alternate}$ included in the candidate set and having the high quality, the satellite sv being in the subset for the subsequent time and at least for the same area A as that with the satellite sv included in the alternative request list. When replacing the satellite sv with another satellite $sv_{alternate}$ in the subset for the one time T, in the present embodiment, the plan alteration unit 85 replaces the same satellite sv included in the subsets for one or more times following the time T with another satellite $sv_{alternate}$.

In step S305, the plan alteration unit 85 deletes the satellite $sv_{alternate}$ from the remainder list. Then the process of step S306 is executed.

In step S306, the plan alteration unit 85 deletes the satellite sv from the alternative request list. Then a process of step S302 is executed again.

FIG. 14 illustrates pseudo codes for the process of the common-satellite alteration. The pseudo codes are a result of coding of algorithm that is somewhat different from the flow of FIG. 13. Either algorithm may be employed as the algorithm.

The process of the common-satellite alteration is carried out every 30 seconds, after the combinations in all of the twelve areas are determined. Initially, in case where the alternative satellite $sv_{alternative}$ to each satellite sv included in the alternative request list exists, the plan alteration unit 85 deletes the satellite sv from the common satellites $CS_{T+1:T+pmin}$ for time T+1 through time T+pmin. The alternative satellite $sv_{alternate}$ is a satellite 10 that has both an average and a worst value of the ranging accuracy in all the areas smaller than the satellite sv has. Subsequently, the plan alteration unit 85 excludes satellites 10 included in a list of the deleted satellites sv from the selection candidates and expands the common satellites $CS_{T+1:T+pmin}$ for the time T+1 through the time T+pmin. In case where a margin exists in the number of the common satellites after expansion, the plan alteration unit 85 excludes the satellite 10 having the highest quality among the deleted satellites sv from the list and carries out the expansion again. The plan alteration unit 85 iterates this process until the number of the common satellites reaches Nsat or until the list is emptied. Subsequently, the plan alteration unit 85 excludes the satellites 10 that did not satisfy the quality conditions at the time T from the selection candidates for each area and executes a process of common-satellite confined satellite addition from the time T+1 to the time T+pmin. In case where a margin exists in the number of the satellites after the process, the plan alteration unit 85 similarly iterates the process of excluding the satellite 10 having the highest quality among the deleted satellites sv from the list and adding the satellite 10. After that, the list (including PRN number or the like) of the satellites sv resulting from the iterated process is transferred to the message generation unit 87.

Though the combination of the satellites 10 is selected for each of the twelve areas, in the present embodiment, the number of the areas is not limited to 12 and may be any number equal to or greater than one.

DESCRIPTION OF EFFECTS OF EMBODIMENT

In the present embodiment, the satellite 10 of which the quality of the positioning signal 11 does not satisfy the quality conditions is detected from within the set of the satellites 10 selected in advance as the satellites to be augmented and the set of the satellites 10 to be augmented are modified by replacement of the detected satellite 10 with another satellite 10. Therefore, according to the present embodiment, the satellites 10 to be augmented may be carefully selected in accordance with the quality of the positioning signal 11 from each satellite 10.

According to the present embodiment, the satellites 10 to be augmented may be carefully selected in accordance with the geometrical arrangement of the satellites 10 and the quality of the corrected observed values of the distances and the carefully selected satellites 10 may be accurately augmented, insofar as convenience for the users may not be deteriorated.

In the present embodiment, the plan making unit 84 makes the plan of the combination of the satellites 10 that is to be selected from the current time to pmin epochs after, with use of the geometrical arrangement as an evaluation criterion based on the orbit information 12. The plan alteration unit 85 alters the combination of the satellites 10 in a plan making stage in accordance with the integrity information. Thus the satellites 10 that are to result in a small user range error and a satisfactory geometrical arrangement may be preferentially selected.

On condition that the satellites 10 to be augmented are selected in accordance with instantaneous DOP and angles of elevation in an environment where a large number of satellites 10 may be used, there is a fear that the convenience for the users may be deteriorated because a high frequency of temporal change in the combination of the satellites 10 may result in unstable Kalman filter for positioning calculations in user positioning, poor DOP due to predominance of the satellites 10 having high angles of elevation, or the like. In the present embodiment, however, the plan of the combination of the satellites 10 is made so that selection duration of the selected satellites 10 may be longer than specified minimum time. In case where an interval between two neighboring continuous selection times is shorter than the minimum time for each satellite 10, the two neighboring continuous selection times are linked so as to be one continuous selection time. Thus the convenience for the users is improved by a tendency toward stabilization in the Kalman filter for the positioning calculations in the user positioning, improvement in DOP, or the like. Namely, according to the present embodiment, the satellites 10 are continuously selected for a period sufficiently longer than convergence time in the positioning calculations and thus the augmentation information that allows the users to carry out stable positioning may be provided.

Application Example of Embodiment

An example of application of satellite selection algorithm according to the present embodiment that is intended for GPS, QZSS, GLONASS, and Galileo will be described.

As the numbers of the satellites, Nsat=14, Msat=11, and Nhigh=4 were defined. As the number of continuous epochs, pmin=10 was set, so that pmin epochs were made 300 seconds. May 13, 2016, when propagating ionospheric disturbance seemed to occur, was selected. Orbits for GPS, the first quasi-zenith satellite, GLONASS, and Galileo were calculated with use of broadcast ephemeris. As for the quasi-zenith satellite 60, a four-satellite constellation was simulated with two quasi-zenith orbit satellites in orbits offset ±135 degrees from a right ascension of ascending node of the first satellite and one geostationary orbit satellite in an orbit at 127 degrees of east longitude. For the evaluation of the quality, a value of ROTI calculated from observed values at the electronic reference points 20 in a vicinity of center of the area was substituted for the integrity information. In substitution for the integrity information, in this manner, another index value may be used as long as the index has relevance to the quality of the positioning signal, the ranging error, or the like. The term "ROTI" is an abbreviation for Rate of TEC Change Index. The ROTI of the satellite sv is a standard deviation of a rate of change in TEC, represented by an expression below, for five minutes centered on the time T.

$$\nabla TEC^{sv}(\tau) = \frac{\{\Phi^{sv}_{s(1)}(\tau+1) - \Phi^{sv}_{s(2)}(\tau+1)\} - \{\Phi^{sv}_{s(1)}(\tau) - \Phi^{sv}_{s(2)}(\tau)\}}{40.3 \cdot 10^{16} \cdot 30 \left( \frac{1}{f^2_{s(1)}} - \frac{1}{f^2_{s(2)}} \right)}$$

FORMULA 3

Where

τ: time at intervals of 30 seconds $\Phi_{s(i)}^{sv}$: observable of carrier phase of signal s(i) from satellite sv (i=1, 2: L1 and L2 for GPS and GLONASS, E1 and E5 for Galileo)

$f_{s(i)}$: frequency of signal s(i)

ROTI is the index of ionospheric disturbance on a small space scale. In regard to ROTI, a high correlation has been observed with ionospheric correction error that is the most dominant of factors of the ranging error after correction. In this simulation, the value of ROTI of 0.3 or less was adopted as a quality condition. It was assumed that the three quasi-zenith satellites 60 lacking the observed data 21 satisfied the condition at all times. For the nine remote islands, where the electronic reference points 20 compatible with the GNSS were incomplete, the evaluation of the quality based on the observed values was not carried out and a combination of the satellites that numbered in Msat and that minimized PDOP was selected from within the common satellites determined for the twelve areas.

Figure 15:
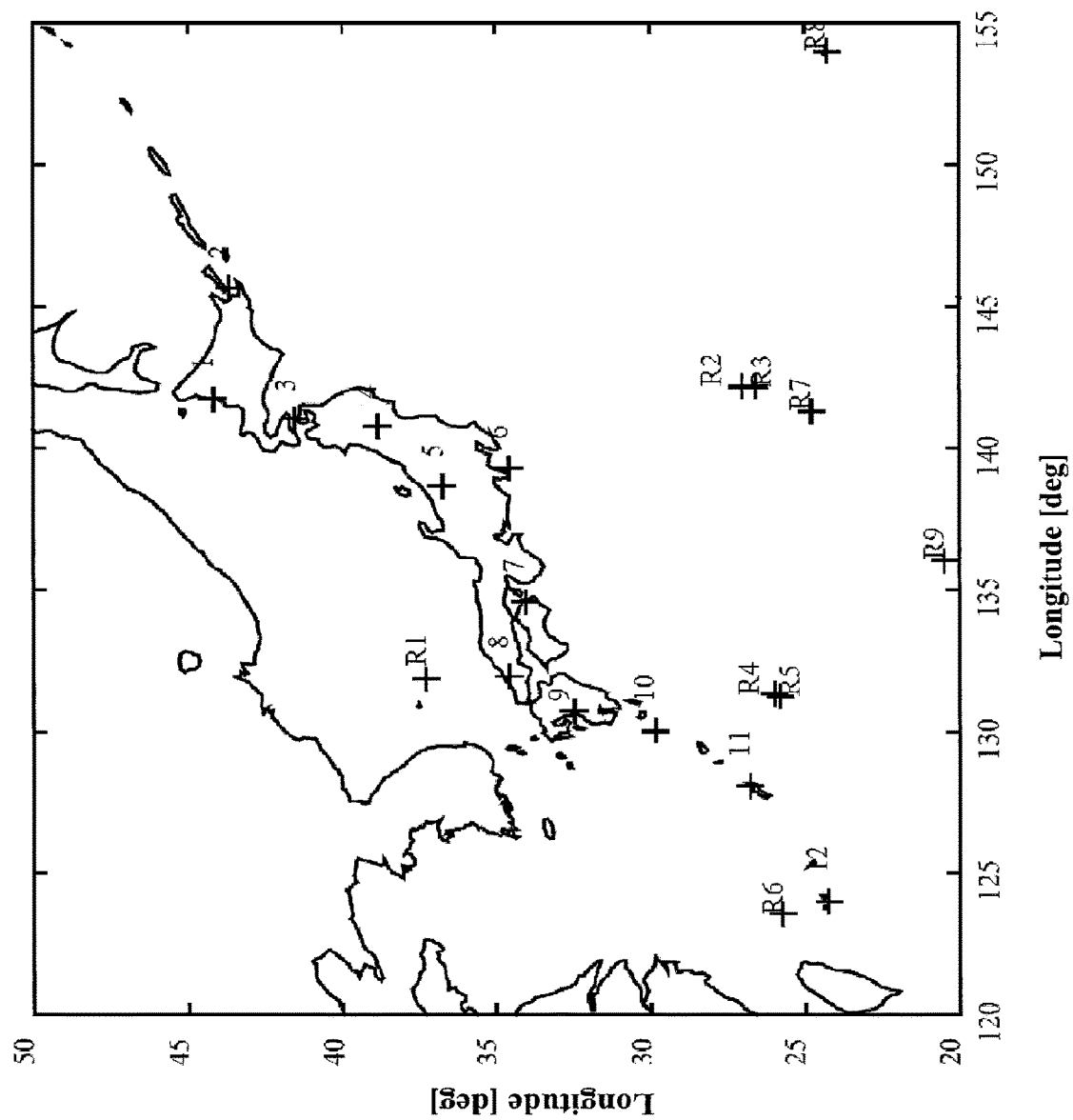
FIG. 15 is a diagram illustrating positions of evaluation points for DOP and of remote islands according to an application example of Embodiment 1.
Figure 16:
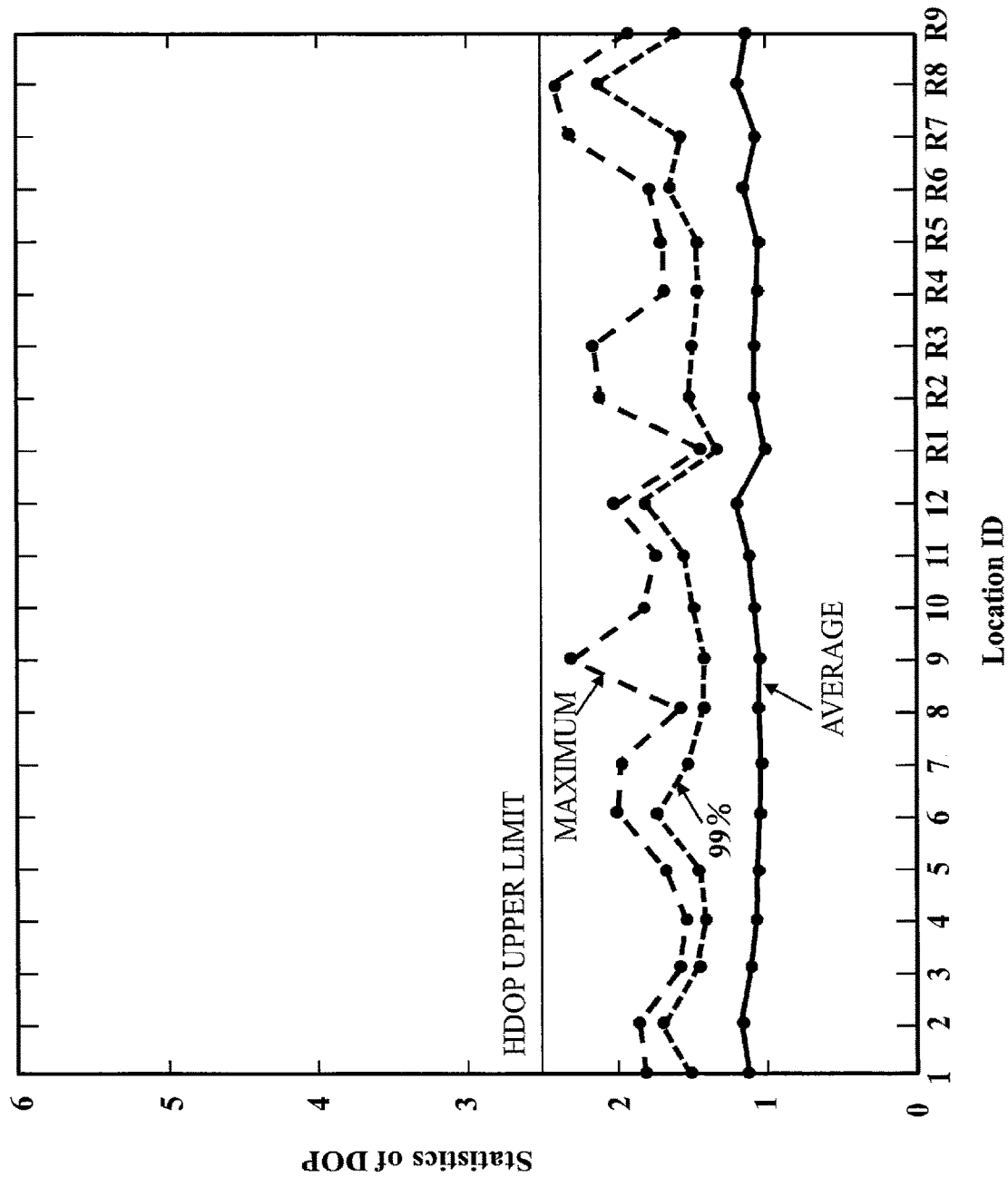
FIG. 16 is a graph illustrating statistics of HDOP according to the application example of Embodiment 1.
Figure 17:
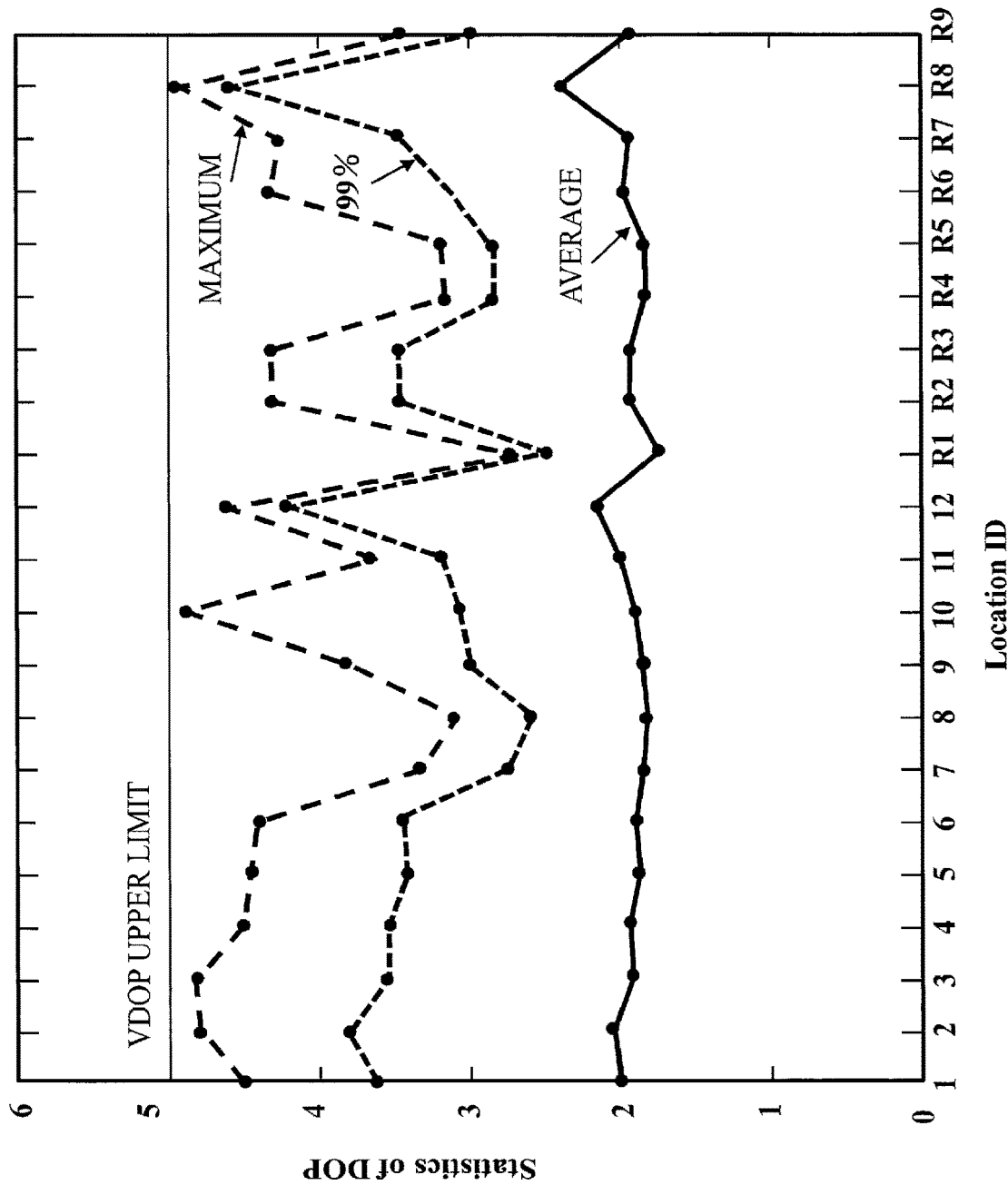
FIG. 17 is a graph illustrating statistics of VDOP according to the application example of Embodiment 1.
Figure 18:
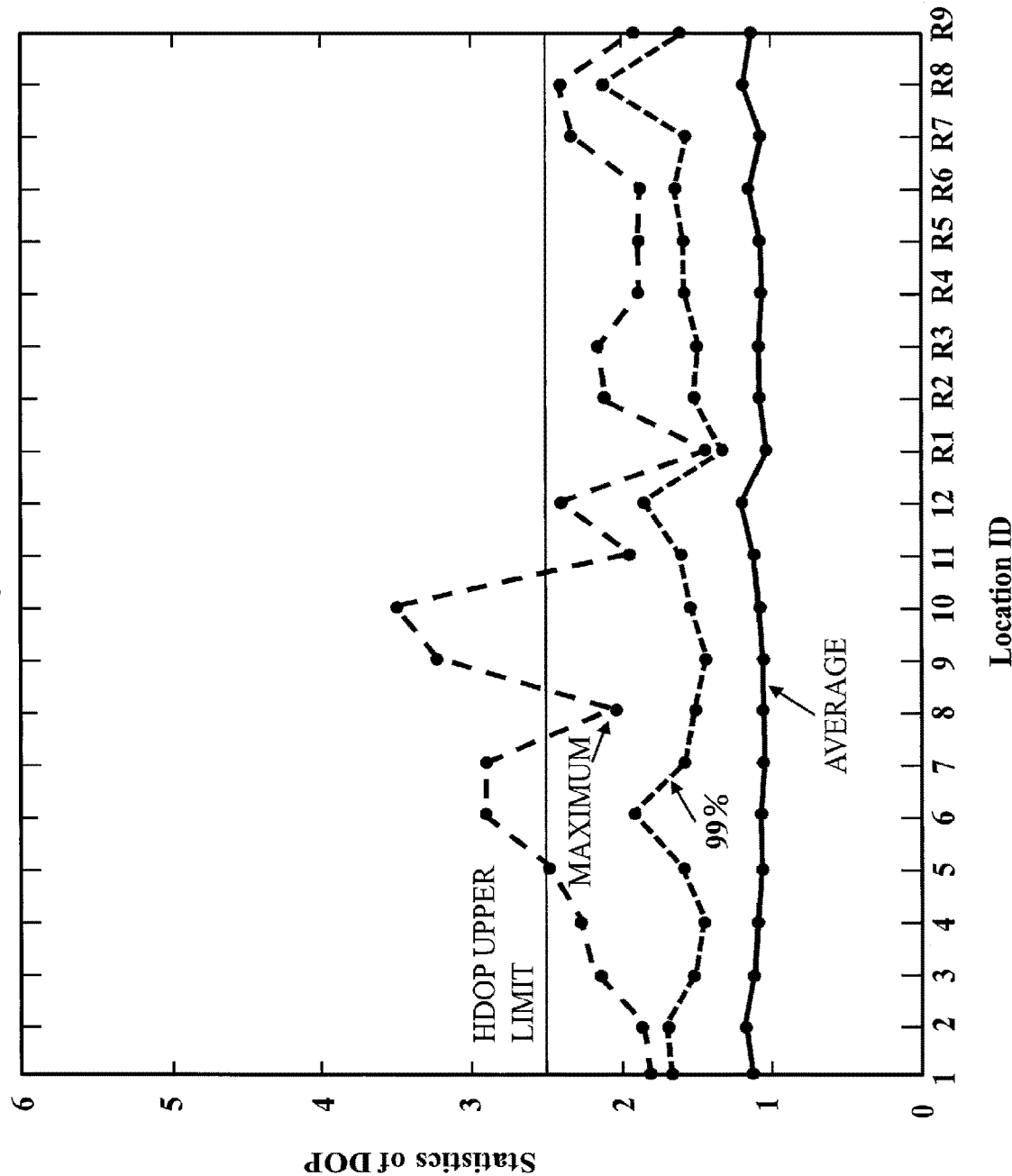
FIG. 18 is a graph illustrating statistics of HDOP according to the application example of Embodiment 1.
Figure 19:
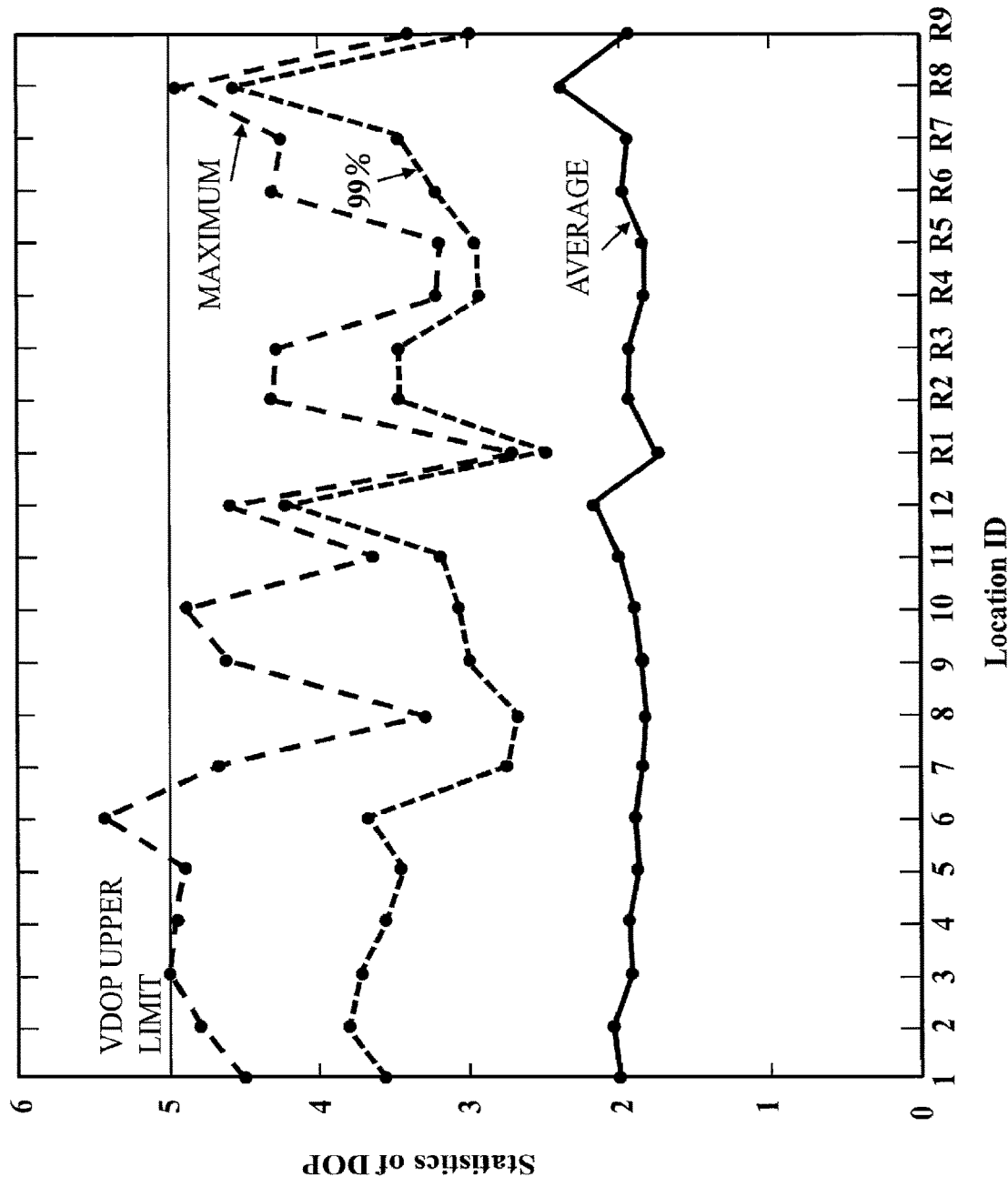
FIG. 19 is a graph illustrating statistics of VDOP according to the application example of Embodiment 1.

Positions of evaluation points for DOP in the twelve areas and of the nine remote islands are illustrated in FIG. 15. Results of evaluations in the planning stage of DOP based on the combinations of the satellites 10 in the points and the remote islands are illustrated in FIGS. 16 and 17. Results of evaluations of DOP based on the combinations of the satellites 10 after determination of the combinations in the points and the remote islands are illustrated in FIGS. 18 and 19. FIGS. 16 and 18 illustrate the results of the evaluations of HDOP. The term "HDOP" is an abbreviation for Horizontal DOP. FIGS. 17 and 19 illustrate the results of the evaluations of VDOP. The term "VDOP" is an abbreviation for Vertical DOP. An elevation mask was set at 22.5 degrees on an assumption of a practical open-sky environment. In CLAS, the ambiguity of the carrier phases of two frequencies is determined at terminals. A correction error from which an effect of the ionospheric correction error has been removed, specifically, a total of correction errors related to satellite clock, orbit, inter-signal bias, and tropospheric delay is 5 cm (95%) or less. With upper limits of HDOP and VDOP respectively set at 2.5 and 5, positioning accuracy for the moving body 31 is 12 cm (95%) or less, horizontally, and 24 cm (95%) or less, vertically. As in FIGS. 16 and 17, the combinations used in the planning stage, that is, on occasions when the ionospheric disturbance was not to occur, made DOP smaller than or equal to the upper limit value for all the areas and all the times. After the determination of the combinations, as in FIGS. 18 and 19, DOP was smaller than or equal to the upper limit value at most times (99% or more), though temporarily exceeded the upper limit value due to the replacement of some of the satellites 10 satisfactory in the geometrical arrangement.

Other Configurations

Though the functions of the error state estimation unit 81, the integrity information generation unit 82, the candidate determination unit 83, the plan making unit 84, the plan alteration unit 85, the evaluation notification unit 86, and the message generation unit 87 are implemented by software in the present embodiment, the functions may be implemented by hardware in a modification. Differences of the modification from the present embodiment will be mainly described.

Figure 20:
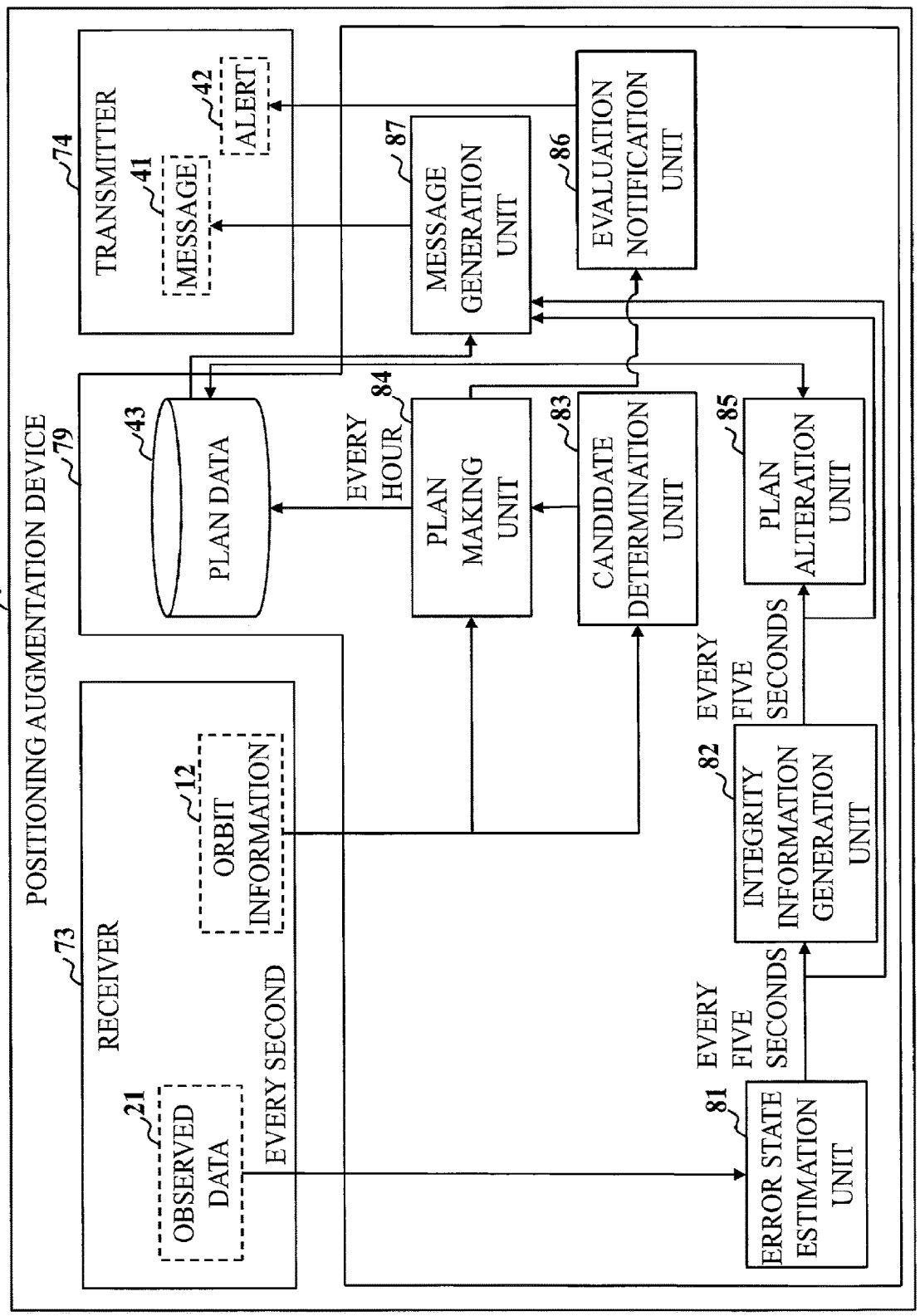
FIG. 20 is a block diagram illustrating a configuration of a positioning augmentation device according to a modification of Embodiment 1.

With reference to FIG. 20, a configuration of the positioning augmentation device 40 according to the modification of the present embodiment will be described.

The positioning augmentation device 40 includes hardware such as a processing circuit 79, the receiver 73, and the transmitter 74.

The processing circuit 79 is a dedicated electronic circuit that implements the functions of the error state estimation unit 81, the integrity information generation unit 82, the candidate determination unit 83, the plan making unit 84, the plan alteration unit 85, the evaluation notification unit 86, and the message generation unit 87. The processing circuit 79 is a single circuit, a composite circuit, a programmed processor, a parallelly programmed processor, a logic IC, a GA, an FPGA, or an ASIC, for instance. The term "GA" is an abbreviation for Gate Array. The term "FPGA" is an abbreviation for Field-Programmable Gate Array. The term "ASIC" is an abbreviation for Application Specific Integrated Circuit.

The positioning augmentation device 40 may include a plurality of processing circuits as an alternative to the processing circuit 79. The plurality of processing circuits as a whole implement the functions of the error state estimation unit 81, the integrity information generation unit 82, the candidate determination unit 83, the plan making unit 84, the plan alteration unit 85, the evaluation notification unit 86, and the message generation unit 87. Each of the processing circuits is a dedicated electronic circuit, as with the processing circuit 79.

In another modification, the functions of the error state estimation unit 81, the integrity information generation unit 82, the candidate determination unit 83, the plan making unit 84, the plan alteration unit 85, the evaluation notification unit 86, and the message generation unit 87 may be implemented by a combination of software and hardware. That is, some of the functions of the error state estimation unit 81, the integrity information generation unit 82, the candidate determination unit 83, the plan making unit 84, the plan alteration unit 85, the evaluation notification unit 86, and the message generation unit 87 may be implemented by a dedicated electronic circuit and the remaining functions may be implemented by software.

The processor 71, the memory 72, and the processing circuit 79 are collectively referred to as "processing circuitry". That is, the functions of the error state estimation unit 81, the integrity information generation unit 82, the candidate determination unit 83, the plan making unit 84, the plan alteration unit 85, the evaluation notification unit 86, and the message generation unit 87 are implemented by the processing circuitry, whichever of the configurations illustrated in FIGS. 4 and 20 the configuration of the positioning augmentation device 40 is.

The "device" of the positioning augmentation device 40 may be read as "method" and the "unit" of each of the error state estimation unit 81, the integrity information generation unit 82, the candidate determination unit 83, the plan making unit 84, the plan alteration unit 85, the evaluation notification unit 86, and the message generation unit 87 may be read as "step". Alternatively, the "device" of the positioning augmentation device 40 may be read as "program", "program product", or "computer-readable medium having program recorded therein" and the "unit" of each of the error state estimation unit 81, the integrity information generation unit 82, the candidate determination unit 83, the plan making unit 84, the plan alteration unit 85, the evaluation notification unit 86, and the message generation unit 87 may be read as "procedure" or "process".

REFERENCE SIGNS LIST

10: satellite; 11: positioning signal; 12: orbit information; 20: electronic reference point; 21: observed data; 30: positioning augmentation system; 31: moving body; 40: positioning augmentation device; 41: message; 42: alert; 43: plan data; 50: ground station; 51: uplink signal; 60: quasi-zenith satellite; 61: L6 signal; 62: main frame; 63: subframe; 71: processor; 72: memory; 73: receiver; 74: transmitter; 79: processing circuit; 81: error state estimation unit; 82: integrity information generation unit; 83: candidate determination unit; 84: plan making unit; 85: plan alteration unit; 86: evaluation notification unit; 87: message generation unit

The invention claimed is:

1. A positioning augmentation device to select satellites as objects of positioning augmentation among a plurality of satellites that each transmit a positioning signal and to generate a message for distribution, for a plurality of areas, of augmentation information for the positioning augmentation, the positioning augmentation device comprising:
processing circuitry
for selection of satellites as objects of positioning augmentation, to select a subset, for each of the plurality of areas, satisfying selection conditions from within a candidate set that is a set of satellites being selection candidates and to save plan data indicating the selected subset for each area in a memory;
to acquire integrity information, for each of the plurality of areas, indicating quality of a positioning signal, the quality being calculated, for each satellite, from observed values at the electronic reference points whose coordinate values have been known, to detect, for each area, a satellite of which the quality of the positioning signal of the area concerned does not satisfy quality conditions, from within the subset of the area concerned, based on the integrity information of the area concerned indicating the quality of the positioning signal for each satellite, and to modify the plan data saved in the memory into plan data of the area concerned indicating another subset that satisfies the selection conditions for the selection of satellites as objects of positioning augmentation by replacing the detected satellite in the subset with another satellite included in the candidate set; and
to make satellites, included in the subset indicated by the plan data saved in the memory among the satellites included in the candidate set, objects of the positioning augmentation and to generate a message for distribution, for the plurality of areas, of augmentation information for the positioning augmentation.

2. The positioning augmentation device according to claim 1, wherein
the processing circuitry selects the subset satisfying the selection conditions, in accordance with angles of elevation of the satellites included in the candidate set and accuracy deterioration due to an arrangement of the satellites.

3. The positioning augmentation device according to claim 2, wherein
the processing circuitry selects the subset that satisfies the selection conditions by executing a first process of selecting satellites that have angles of elevation equal to or greater than a threshold from the candidate set and thereafter iterating a second process of selecting, from the candidate set, a satellite that decreases the accuracy deterioration due to the arrangement of the selected satellites, as long as selection of the subsequent satellite still makes a set of the selected satellites satisfy the selection conditions.

4. The positioning augmentation device according to claim 3, wherein
the processing circuitry selects the subset for every second unit time, as the subset satisfying the selection conditions, every first unit time made of a plurality of second unit times.

5. The positioning augmentation device according to claim 4, wherein
the processing circuitry executes a process of selecting, from the candidate set, a satellite that minimizes the accuracy deterioration due to the arrangement of the selected satellites, as the second process, for peak time that is the second unit time when the accuracy deterioration due to the arrangement of the selected satellites is maximized in the same first unit time at beginning of the second process and executes a third process of selecting the same satellite as in the second process for one or more second unit times following the peak time.

6. The positioning augmentation device according to claim 4, wherein
the processing circuitry executes the first process for each of the plurality of areas and executes a process of selecting, from the candidate set, a satellite that minimizes the accuracy deterioration due to the arrangement of the selected satellites, as the second process, for a combination of the second unit time and an area in which the accuracy deterioration due to the arrangement of the selected satellites is maximized in the same first unit time at beginning of the second process.

7. The positioning augmentation device according to claim 6, wherein
a condition on a total number of the satellites included in the subset for each area indicated by the plan data and a condition on a total number of satellites included in a union of the subsets for all the areas indicated by the plan data are included in the selection conditions.

8. The positioning augmentation device according to claim 1, wherein
the processing circuitry selects the subset satisfying the selection conditions, for each of the plurality of areas, and
the processing circuitry selects the another satellite with a preference for satellites included in a union of the subsets for all areas selected by the processing circuitry over remaining satellites included in the candidate set.

9. The positioning augmentation device according to claim 8, wherein
the processing circuitry selects the subset for every second unit time made of a plurality of third unit times, as the subset satisfying the selection conditions, and
the processing circuitry acquires the integrity information every the third unit time, determines, upon detection of the satellite of which the quality of the positioning signal does not satisfy the quality conditions, from within the subset selected by the processing circuitry for corresponding second unit time and one area, based on the integrity information, whether a satellite of which the quality of the positioning signal is higher than the quality of the positioning signals of the detected satellites is included or not in a union of the subsets selected by the processing circuitry for the corresponding second unit time and all the areas, based on the integrity information, and replaces, in case where the satellite having the higher quality is included in the union, the detected satellite in the subset for the one area with the satellite included in the union and having the higher quality.

10. The positioning augmentation device according to claim 9, wherein
upon the detection of the satellite of which the quality of the positioning signal does not satisfy the quality conditions, from within the subset selected by the processing circuitry for the corresponding second unit time and the one area and in case where any satellite of which the quality of the positioning signal is higher than the quality of the positioning signals of the detected satellite is not included in the union of the subsets selected by the processing circuitry for the corresponding second unit time and all the areas, the processing circuitry determines whether a satellite of which the quality of the positioning signal is higher than the quality of the positioning signals of the detected satellite is included or not in the candidate set, based on the integrity information; and in case where the satellite having the higher quality is included in the candidate set, the processing circuitry replaces the detected satellite in the subset for subsequent second unit time and at least the one area with the satellite having the higher quality included in the candidate set.

11. The positioning augmentation device according to claim 9, wherein
the processing circuitry, when determining whether the satellite of which the quality of the positioning signal is higher than the quality of the positioning signal of the detected satellite is included or not in one set, determines that the satellite having the higher quality is included in the one set on condition that any satellite of which the quality of the positioning signals for all the areas is higher than the quality of the positioning signals for all the areas of the detected satellite is included in the one set.

12. The positioning augmentation device according to claim 9, wherein
the processing circuitry, when replacing the detected satellite in the subset for one second unit time with the another satellite, replaces the same satellite included in the subsets for one or more second unit times following the one second unit time with the another satellite.

13. The positioning augmentation device according to claim 1, wherein
the processing circuitry transmits the message to a satellite to distribute the augmentation information.

14. The positioning augmentation device according to claim 1, further comprising:
the processing circuitry acquires operational information indicating operation status of each satellite and to determine the candidate set based on the operational information.

15. The positioning augmentation device according to claim 1, further comprising:
the processing circuitry makes an evaluation of accuracy deterioration due to an arrangement of the satellites included in the subset selected by the processing circuitry and to notify an operator of a result of the evaluation.

16. A positioning augmentation system comprising:
the positioning augmentation device according to claim 1; and
a satellite to distribute the augmentation information.

17. A positioning augmentation method to select satellites as objects of positioning augmentation among a plurality of satellites that each transmit a positioning signal and to generate a message for distribution, for a plurality of areas, of augmentation information for the positioning augmentation, the positioning augmentation method comprising:
for selection of satellites as objects of positioning augmentation, selecting, by a processing circuitry, a subset, for each of the plurality of areas, satisfying selection conditions from within a candidate set that is a set of satellites being selection candidates and saving plan data indicating the selected subset for each area in a memory;

acquiring, by the processing circuitry, integrity information, for each of the plurality of areas, indicating quality of a positioning signal, the quality being calculated, for each satellite, from observed values at the electronic reference points whose coordinate values have been known, detecting, for each area, a satellite of which the quality of the positioning signals of the area concerned does not satisfy quality conditions, from within the subset of the area concerned selected by the processing circuitry, based on the integrity information of the area concerned indicating the quality of the positioning signal for each satellite, and modifying the plan data saved in the memory into plan data of the area concerned indicating another subset that satisfies the selection conditions for the selection of satellites as objects of positioning augmentation by replacing the detected satellite in the subset with another satellite included in the candidate set; and making, by the processing circuitry, satellites, included in the subset indicated by the plan data saved in the memory among the satellites included in the candidate set, objects of the positioning augmentation and generating a message for distribution, for the plurality of areas, of augmentation information for the positioning augmentation.

* * * * *